March 19, 1963     S. D. SILLIMAN ET AL     3,082,403
BINARY SELF-CHECKING SUPERVISORY CONTROL SYSTEM
Filed Oct. 10, 1956     22 Sheets-Sheet 1

Fig. 1.

| Enumeration or Indication Intervals | Code Combinations | Check Intervals | Total Intervals |
|---|---|---|---|
| 2 | 4 | 3 | 5 |
| 3 | 8 | 3 | 6 |
| 4 | 16 | 3 | 7 |
| 5 | 32 | 4 | 9 |
| 6 | 64 | 4 | 10 |
| 7 | 128 | 4 | 11 |
| 8 | 256 | 4 | 12 |
| 9 | 512 | 4 | 13 |
| 10 | 1024 | 4 | 14 |
| 11 | 2048 | 4 | 15 |

Fig. 2.

| Control Check Pattern ||||||| |
|---|---|---|---|---|---|---|
| Check Intervals | Enumeration Intervals ||| Check Intervals ||| Total Intervals |
| | 1st | 2nd | 3rd | X1 | X2 | X3 | |
| X1 | | + | + | + | | | Odd |
| X2 | + | | | | + | | Odd |
| X3 | + | + | | | | + | Odd |

Fig. 3.

| | Control Code ||||||
|---|---|---|---|---|---|---|
| Code Number | Enumeration Intervals ||| Check Intervals |||
| | 1st | 2nd | 3rd | X1 | X2 | X3 |
| 1 | 1 | 0 | 0 | 1 | 0 | 0 |
| 2 | 0 | 1 | 0 | 0 | 1 | 0 |
| 3 | 1 | 1 | 0 | 0 | 0 | 1 |
| 4 | 0 | 0 | 1 | 0 | 0 | 1 |
| 5 | 1 | 0 | 1 | 0 | 1 | 0 |
| 6 | 0 | 1 | 1 | 1 | 0 | 0 |
| 7 | 1 | 1 | 1 | 1 | 1 | 1 |
| 8 | 0 | 0 | 0 | 1 | 1 | 1 |

Fig. 4.

| Indication Check Pattern ||||||||
|---|---|---|---|---|---|---|---|---|
| Check Intervals | Indication Intervals |||| Check Intervals ||| Total Intervals (1) |
| | 1st | 2nd | 3rd | 4th | X1 | X2 | X3 | |
| X1 | | + | + | + | + | | | Odd |
| X2 | + | | + | + | | + | | Odd |
| X3 | + | + | | + | | | + | Odd |

INVENTORS
Sheldon D. Silliman &
Willard A. Derr.
BY
Francis V. B. Giolma
ATTORNEY

• Auxiliary Switch Open When Circuit Breaker Main Contacts Are Open. See Fig. 7D

* Make Before Break

United States Patent Office 3,082,403
Patented Mar. 19, 1963

3,082,403
BINARY SELF-CHECKING SUPERVISORY
CONTROL SYSTEM
Sheldon D. Silliman, Forest Hills, and Willard A. Derr, Pittsburgh, Pa., assignors to Westinghouse Electric Corporation, East Pittsburgh, Pa., a corporation of Pennsylvania
Filed Oct. 10, 1956, Ser. No. 615,101
8 Claims. (Cl. 340—163)

Our invention relates generally to remote control systems, and it has reference, in particular, to binary self-checking supervisory control systems.

Generally stated, it is an object of our invention to provide a supervisory control system that is extremely flexible and fast, as well as reliable in operation.

More specifically, it is an object of our invention to provide in a self-synchronous supervisory control system for operating a signal generator at a receiving station under the control of signals from a sending station which is remote therefrom.

Another object of our invention is to provide in a supervisory control system for using a substantially free-running signal generator at a signal receiving station and keying or tying-in its operation with that of a generator at a sending station by means of coded signals transmitted from the sending station.

Yet another object of our invention is to provide in a supervisory control system for producing signals to operate counting means for determining a predetermined number of signal intervals, and for transmitting only in predetermined ones of the intervals the signals thus produced.

It is an important object of our invention to provide in a supervisory control system for using control and indication codes which comprise different arrangements of a pulse and the absence of a pulse as the binary quantities.

It is also an object of our invention to provide in a self-synchronous supervisory control system for starting separate signal generators at each of a dispatching and a remote station by means of a start signal, operating counting means from the signal generator at the dispatching office to produce only a predetermined number of signals, rendering the pulse generator at one station ineffective to transmit different ones of said signals, utilizing a receiving relay at the other station to control the signal generator thereat, and utilizing both the receiving relay and the signal generator at the other station to operate counting means thereat.

It is an important object of our invention to provide in a binary self-checking supervisory control system for utilizing signal codes each comprising a fixed number of signal intervals, differentiating between codes by transmitting signals during only selected ones of the intervals, and providing a local signal at the receiving station during the intervals when no signal is transmitted.

Yet another important object of our invention is to provide in a self-synchronous supervisory control system for utilizing signal codes each comprising a fixed total number of signals of two kinds and for sending prior to such fixed number of signals a start signal to start a pulse generator at the receiving end without operating signal counting means at either station.

Other objects will, in part, be obvious and will, in part, be explained hereinafter.

In practicing our invention in accordance with one of its embodiments, supervisory control sending and receiving means at each of a dispatching office and a remote station operate to effect operation of apparatus at the remote station and give indications of its operating position by means of binary codes each comprising a fixed number of control intervals and indication intervals respectively, together with a fixed number of check intervals. The operation and indication intervals selectively comprise either a pulse or the absence of a pulse in different arrangements for the different codes, and check signals of either a pulse or absence of a pulse are provided in a pattern to make the total number of pulses, in different groups of signal intervals with which they are combined, odd. Signal check networks are provided at each the dispatching office and remote station to determine the validity of each code received, according to such predetermined pattern.

Pulse generators are provided at each of the dispatching office and remote station which are started by a start pulse from whichever is the sending end. Counting relays are provided at each end to determine the predetermined number of signal intervals for each code, and in a control operation pulse control relays operated by operation keys at the dispatching office set up circuits to determine in which signal interval pulses are transmitted. Following an automatic operation of a circuit breaker at the remote station, position responsive relays determine in which signal interval pulses are transmitted. The pulse generator at the receiving end is free-running when pulses are not transmitted, and operates the counting relays at that end during signal intervals when no pulse is transmitted. Pulses received at whichever is the receiving end operate a receiving relay and control the receiving pulse generator to keep it in step with the pulse generator at the sending end. The pulse generator and the receiving relay at the receiving end selectively operate the counting means at the receiving end to check the number of pulses received.

For a more complete understanding of the nature and scope of our invention, reference may be made to the following detailed description which may be read in connection with the accompanying drawings, in which:

FIGURE 1 is a tabulation of the number of enumeration signals and check signals in different code combinations;

FIG. 2 is a tabulation showing the check signal pattern for three enumeration pulses in any of different code combinations;

FIG. 3 is a chart showing the eight control code combinations used in the present invention;

FIG. 4 is a tabulation showing the check signal pattern for four indication signals in any of the different indication code arrangements;

Figure 5A:
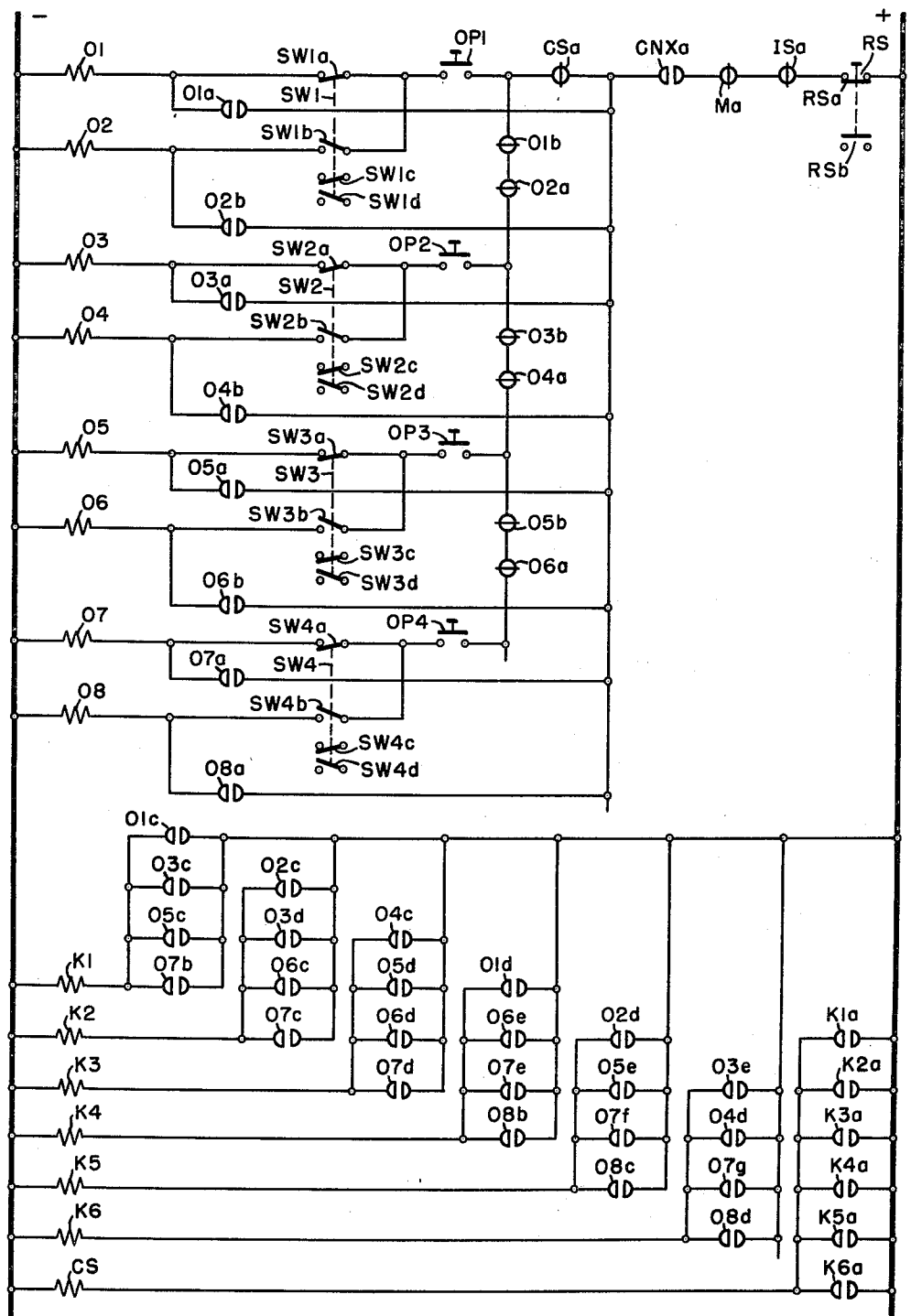
Figure 5B:
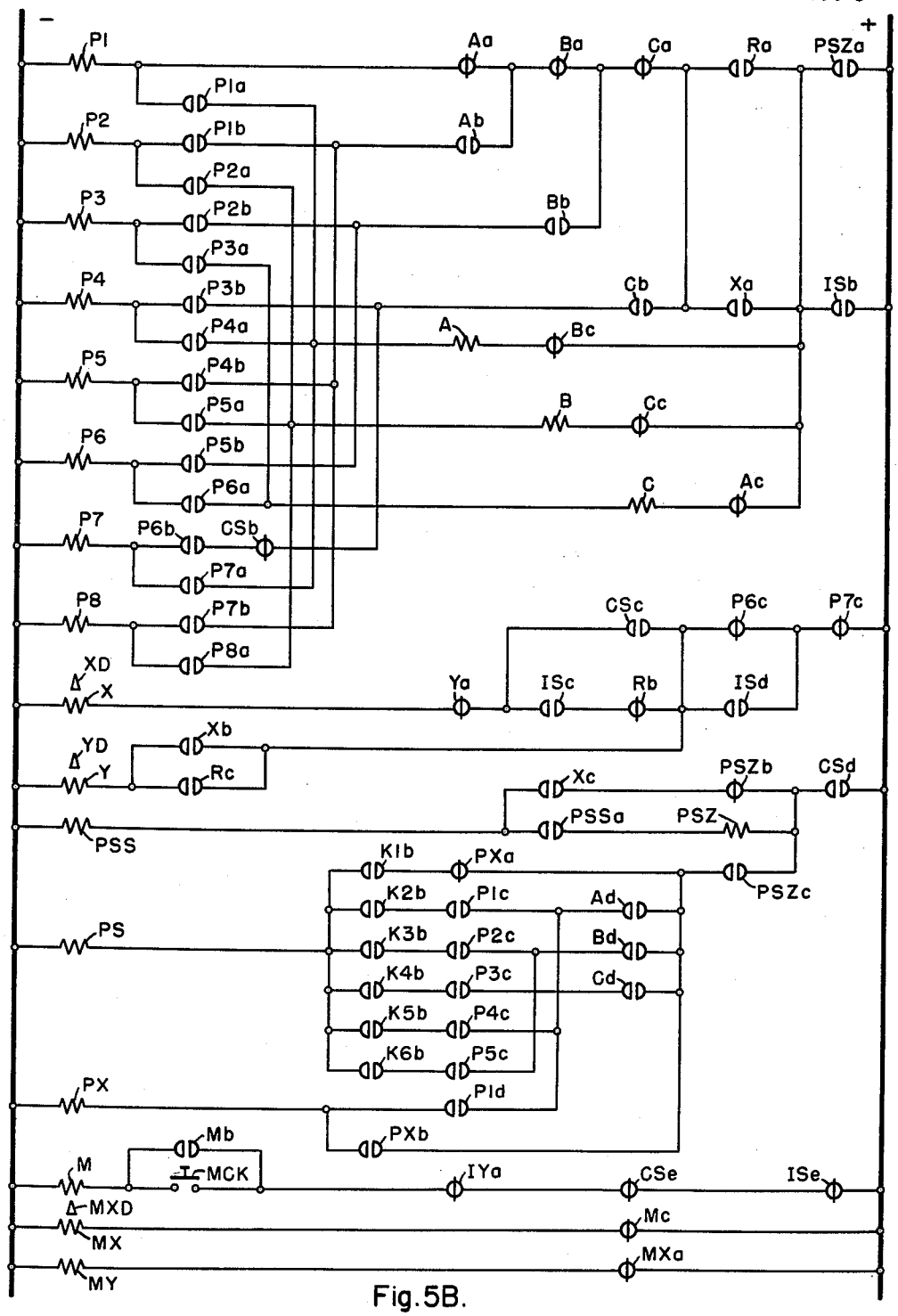
Figure 5C:
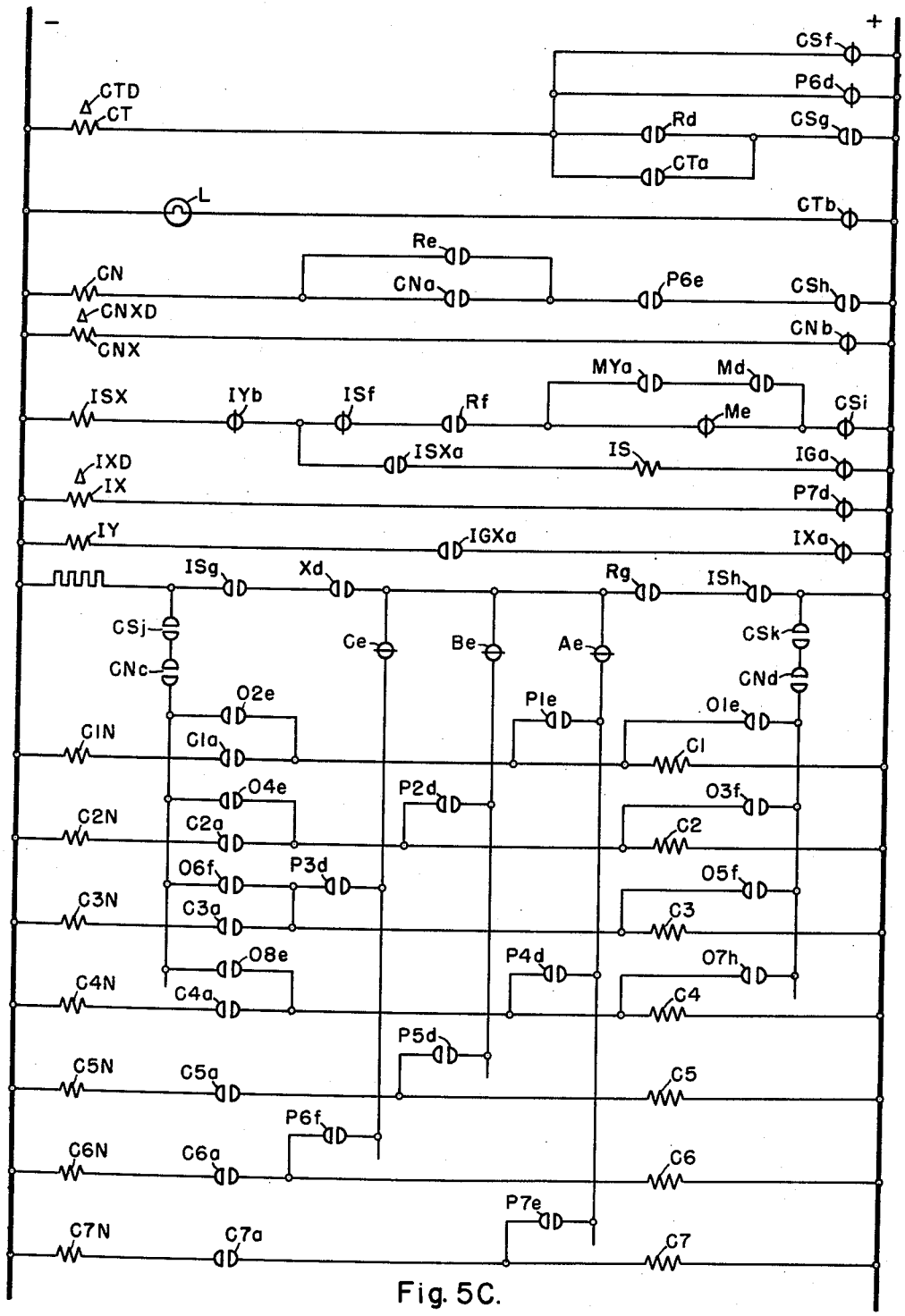
Figure 5D:
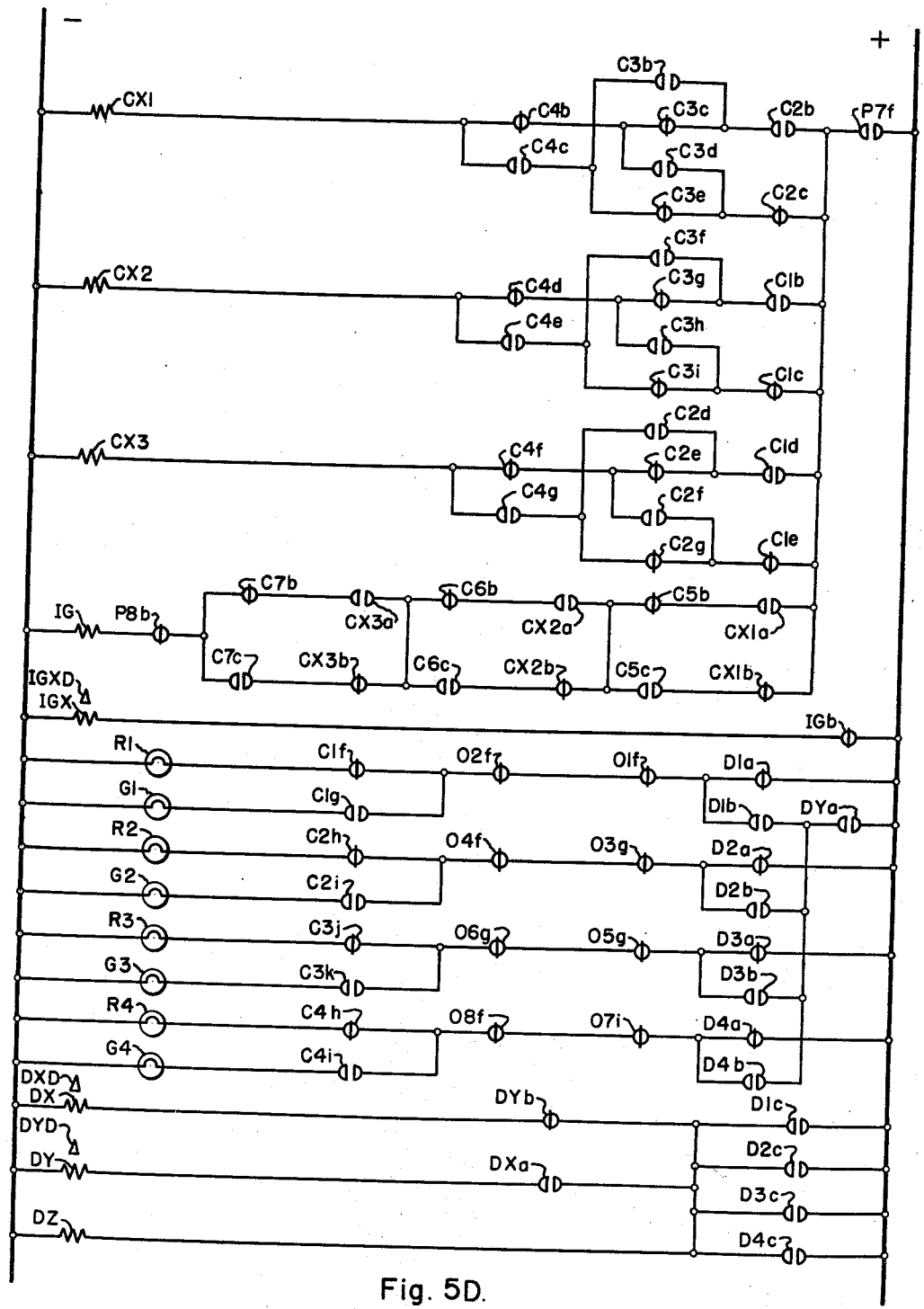
Figure 5E:
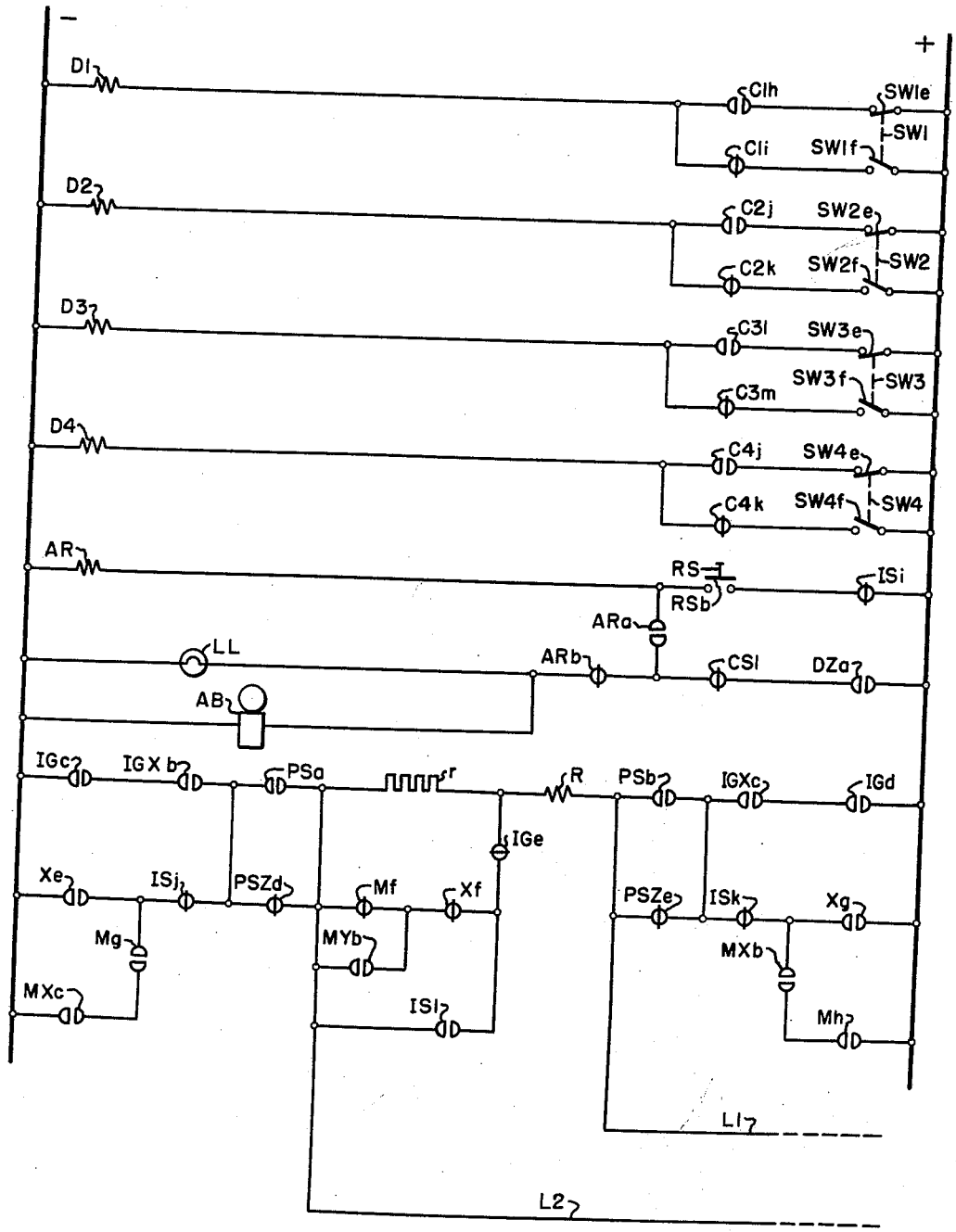
Figure 6A:
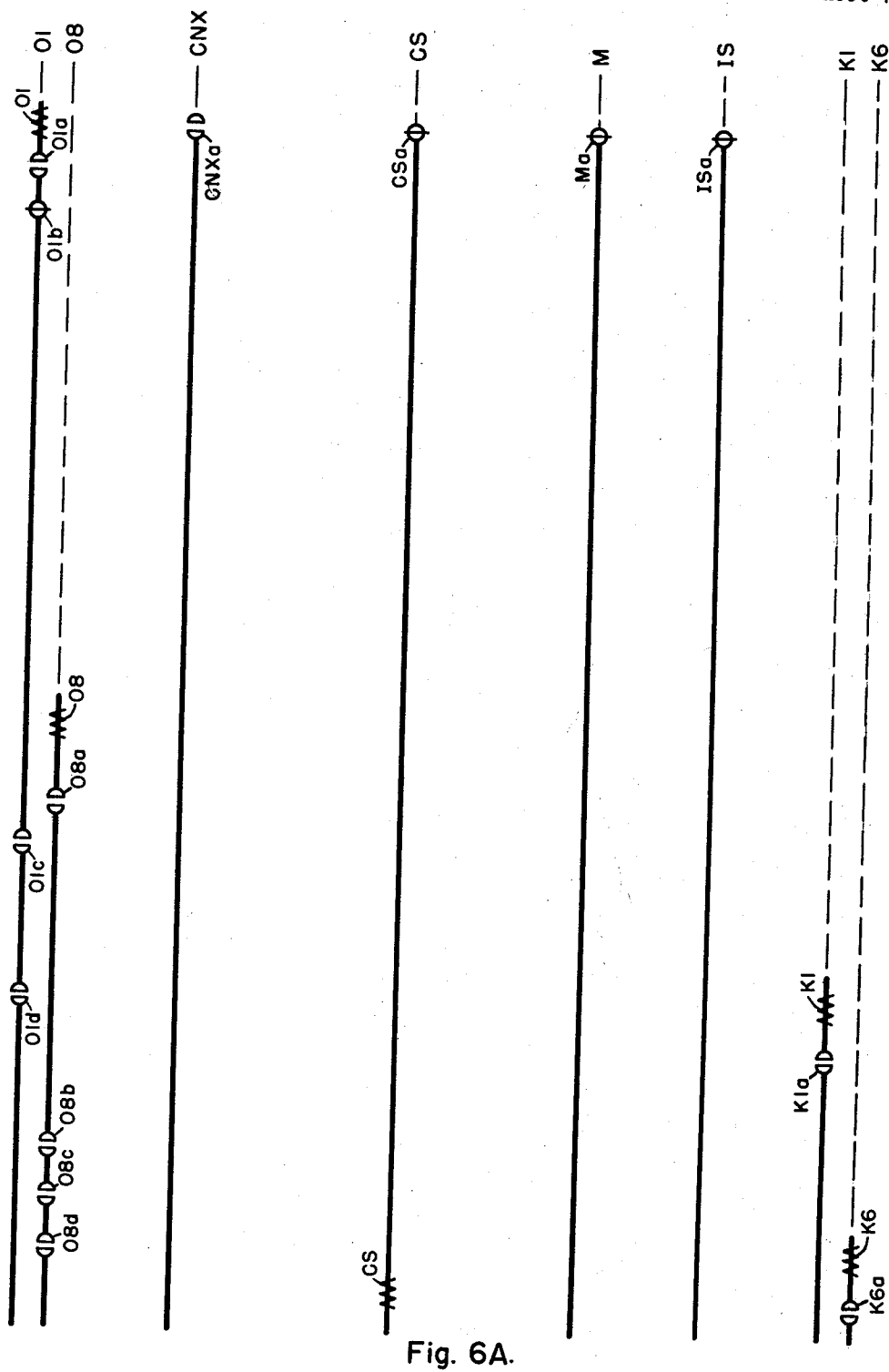
Figure 6B:
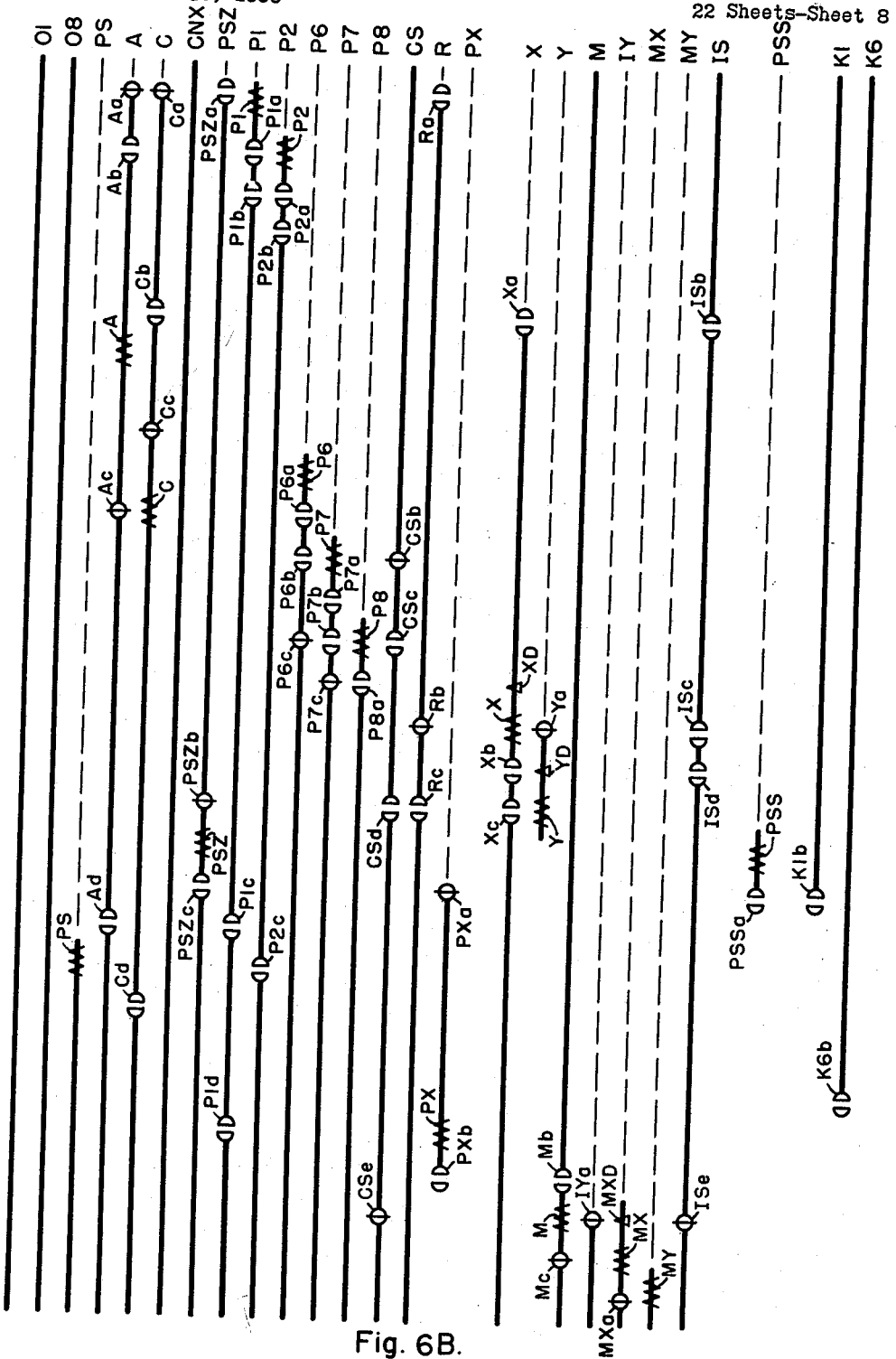
Figure 6C:
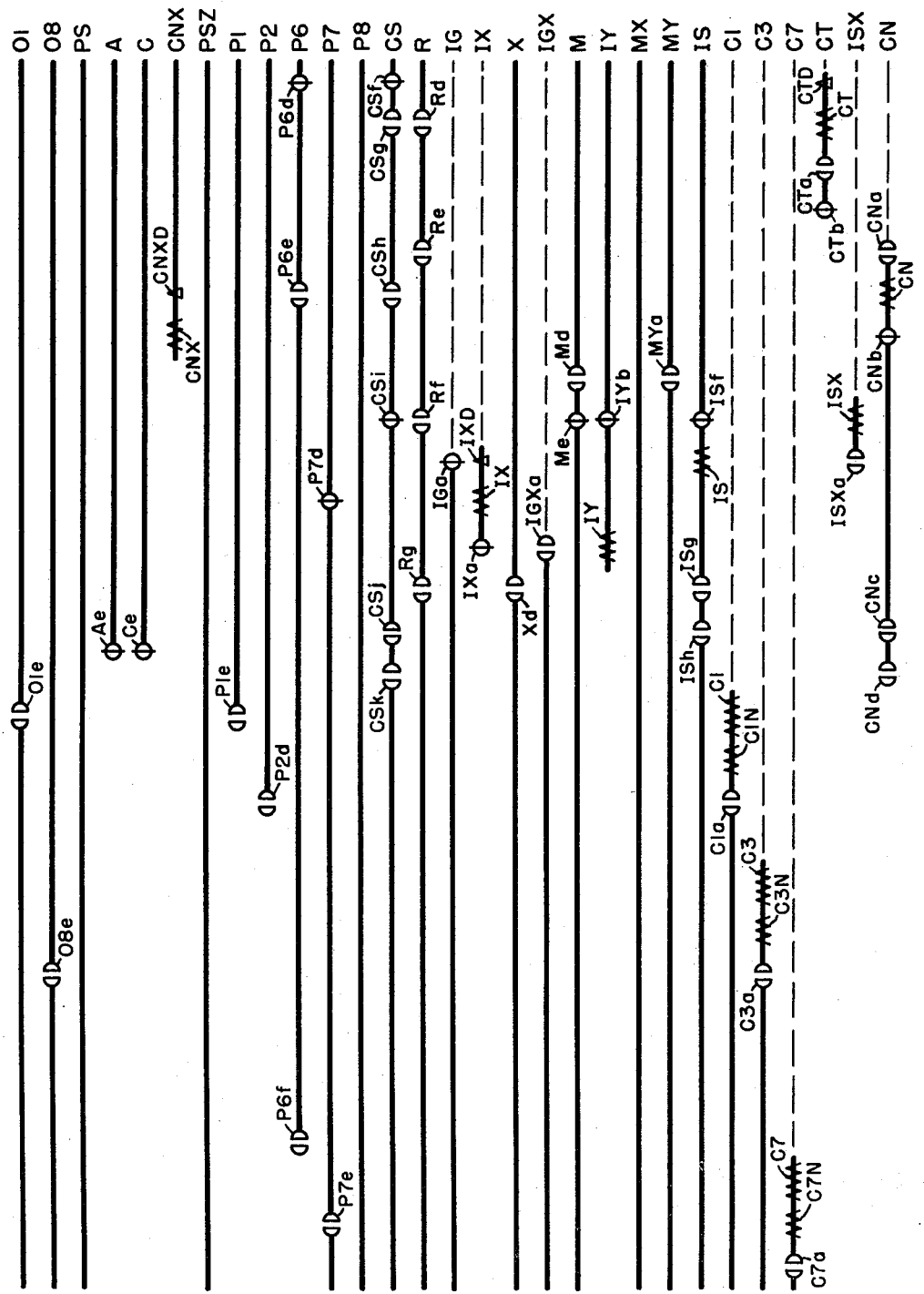
Figure 6D:
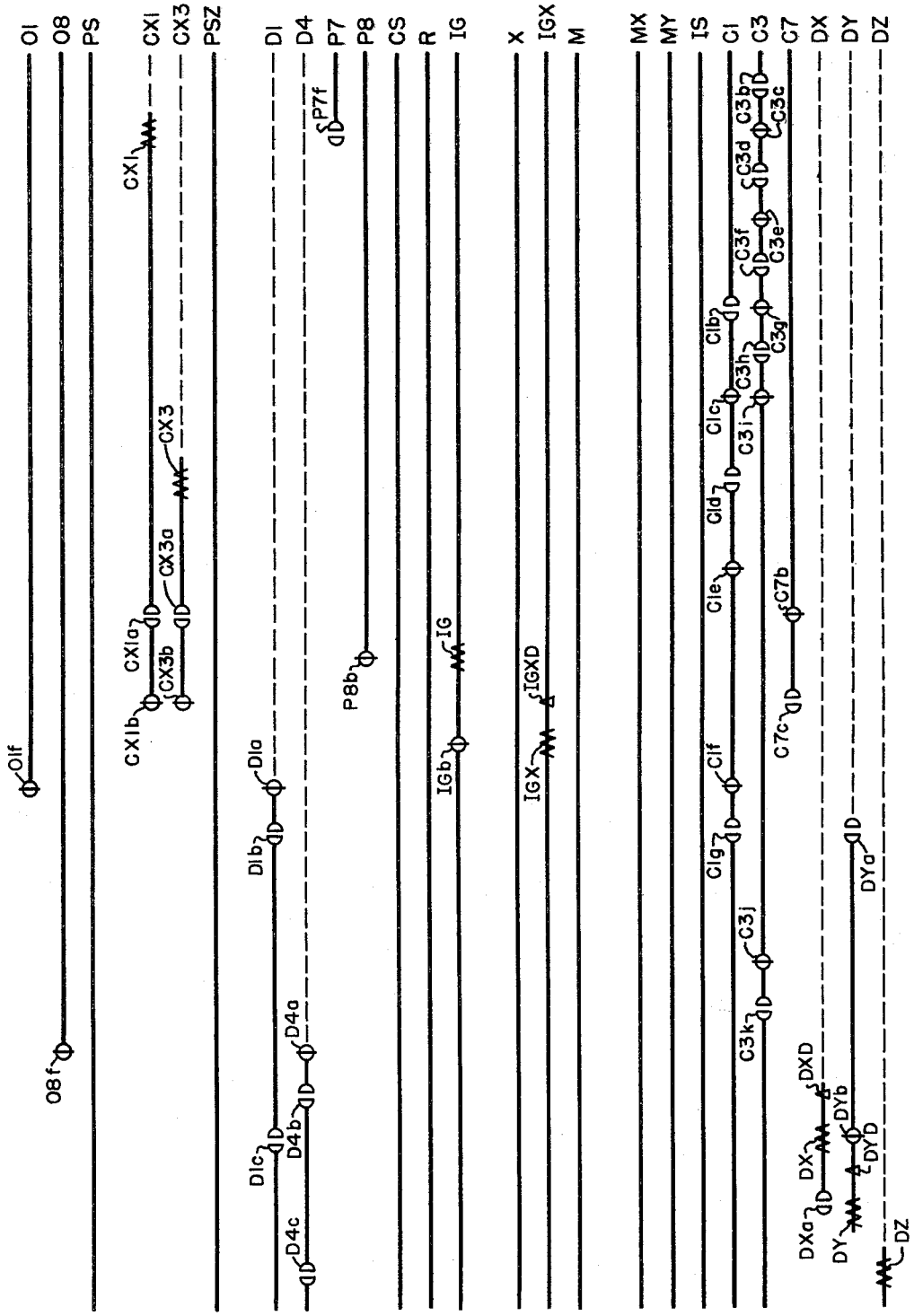
Figure 6E:
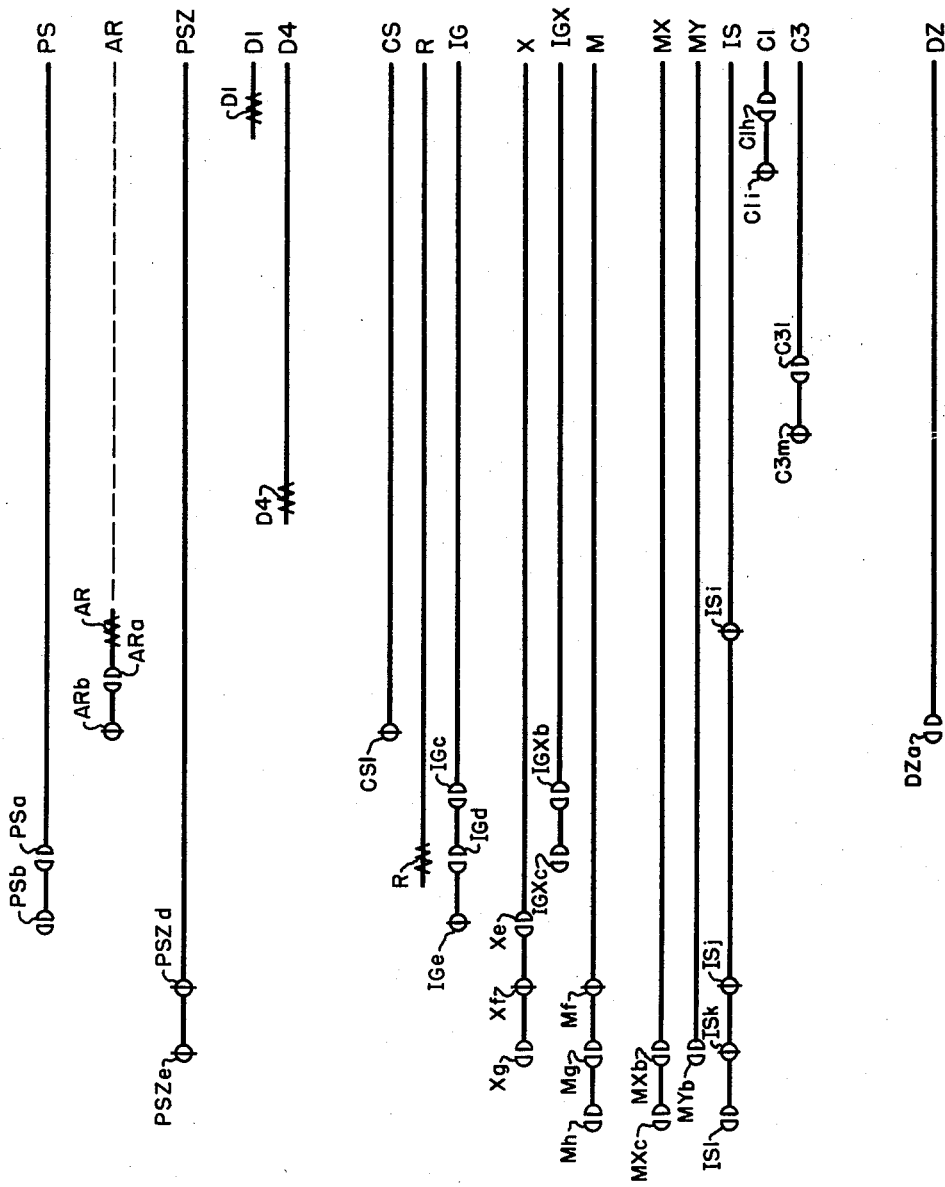
Figure 7A:
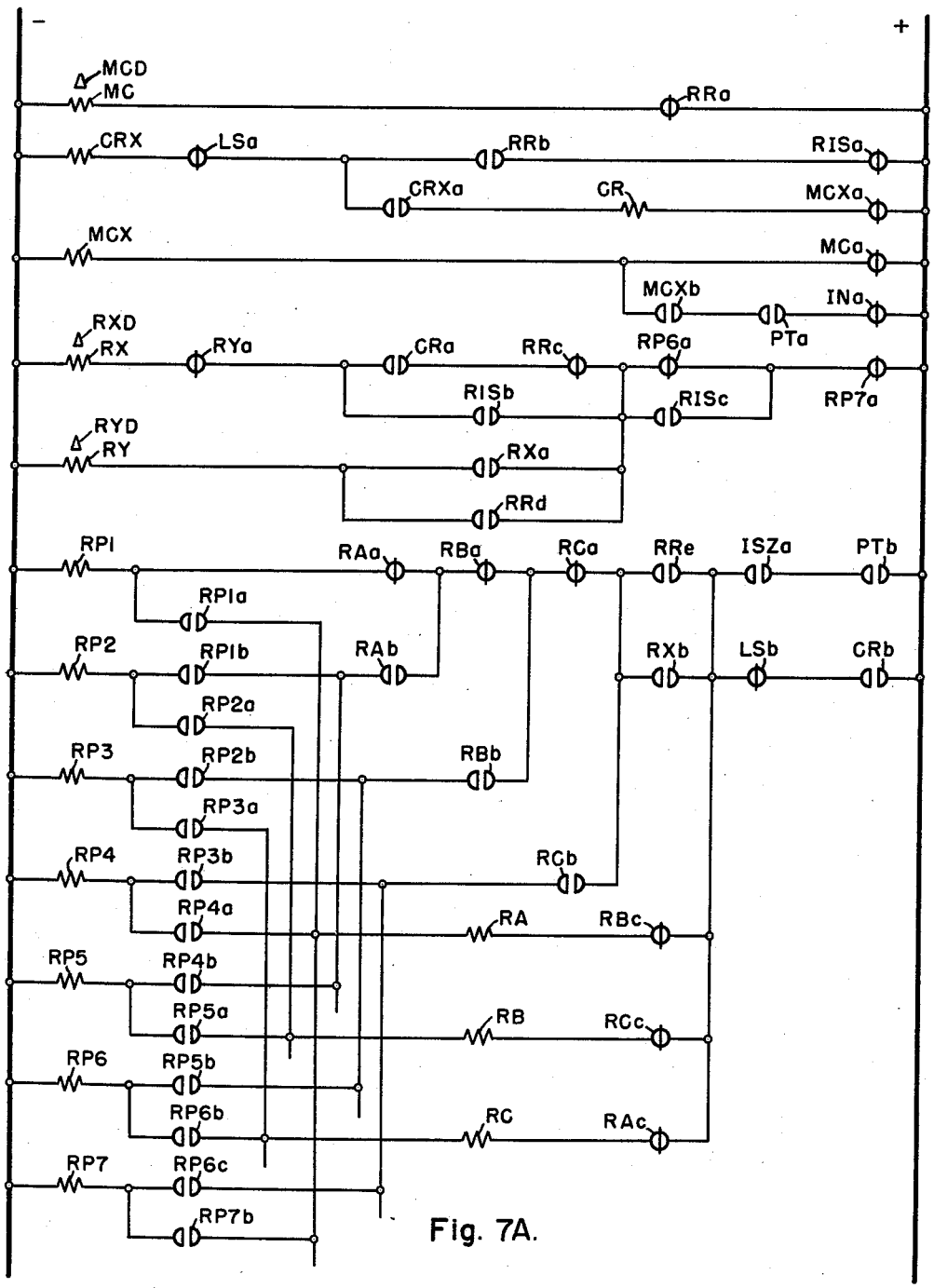
Figure 7B:
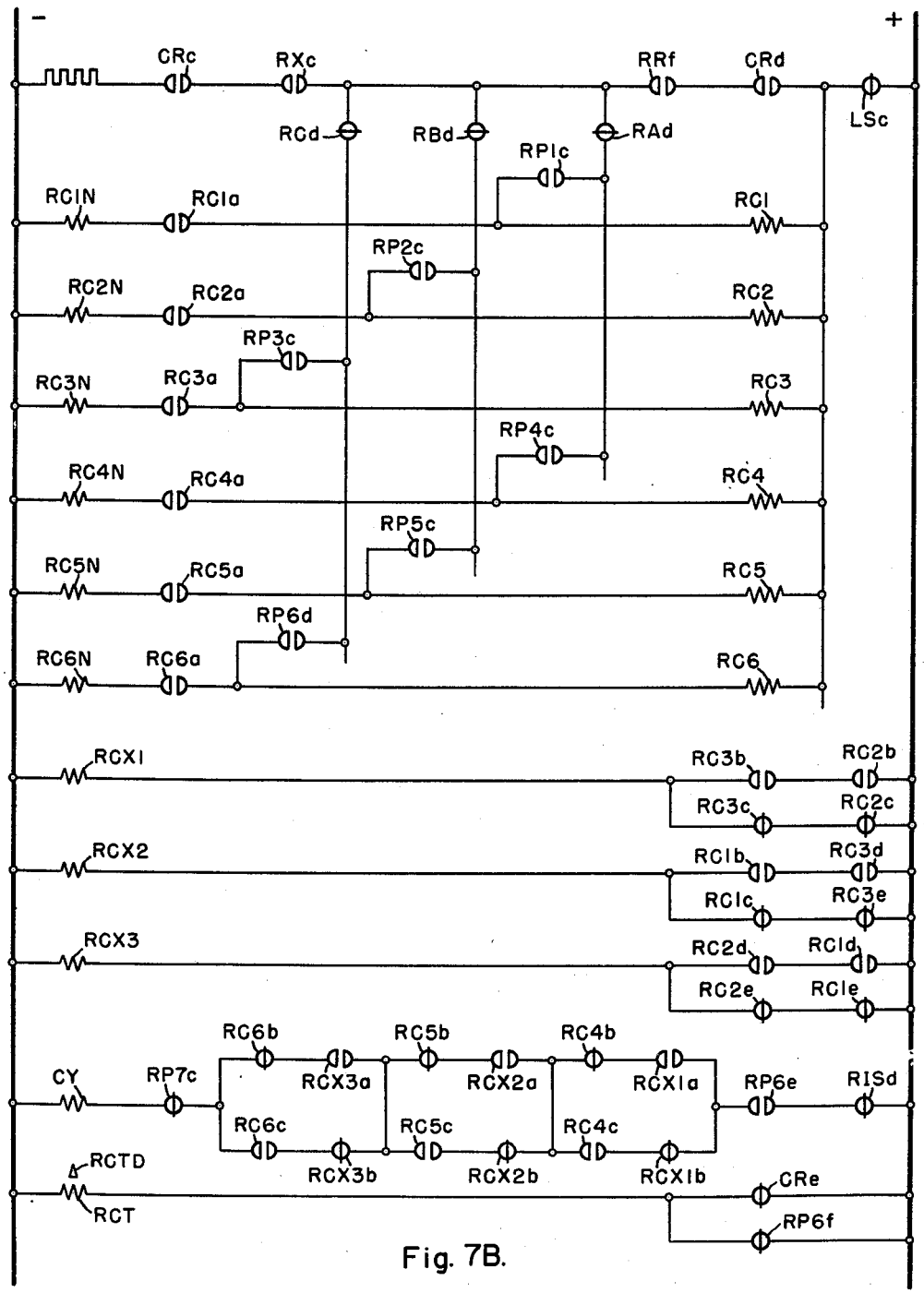
Figure 7C:
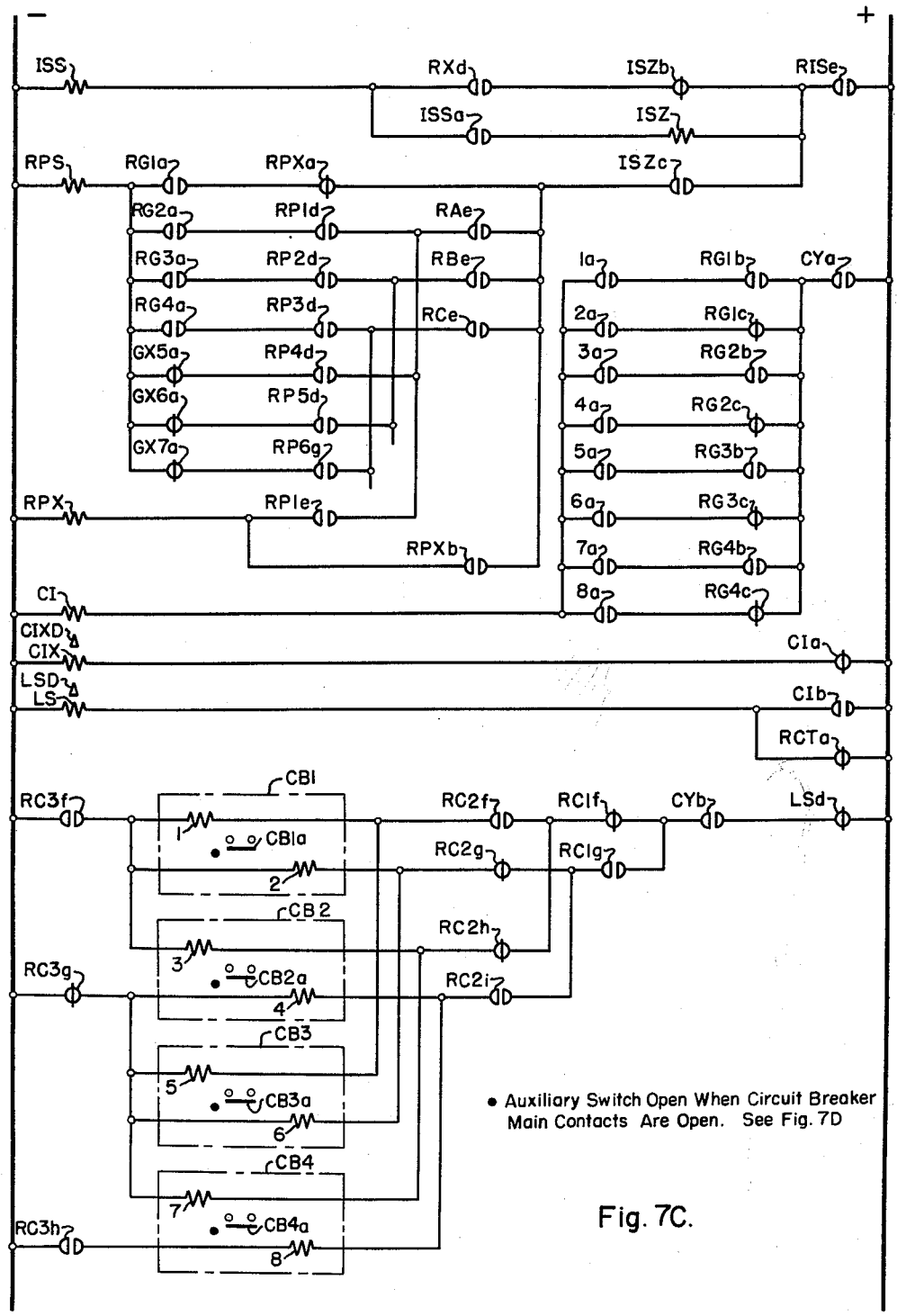
Figure 7D:
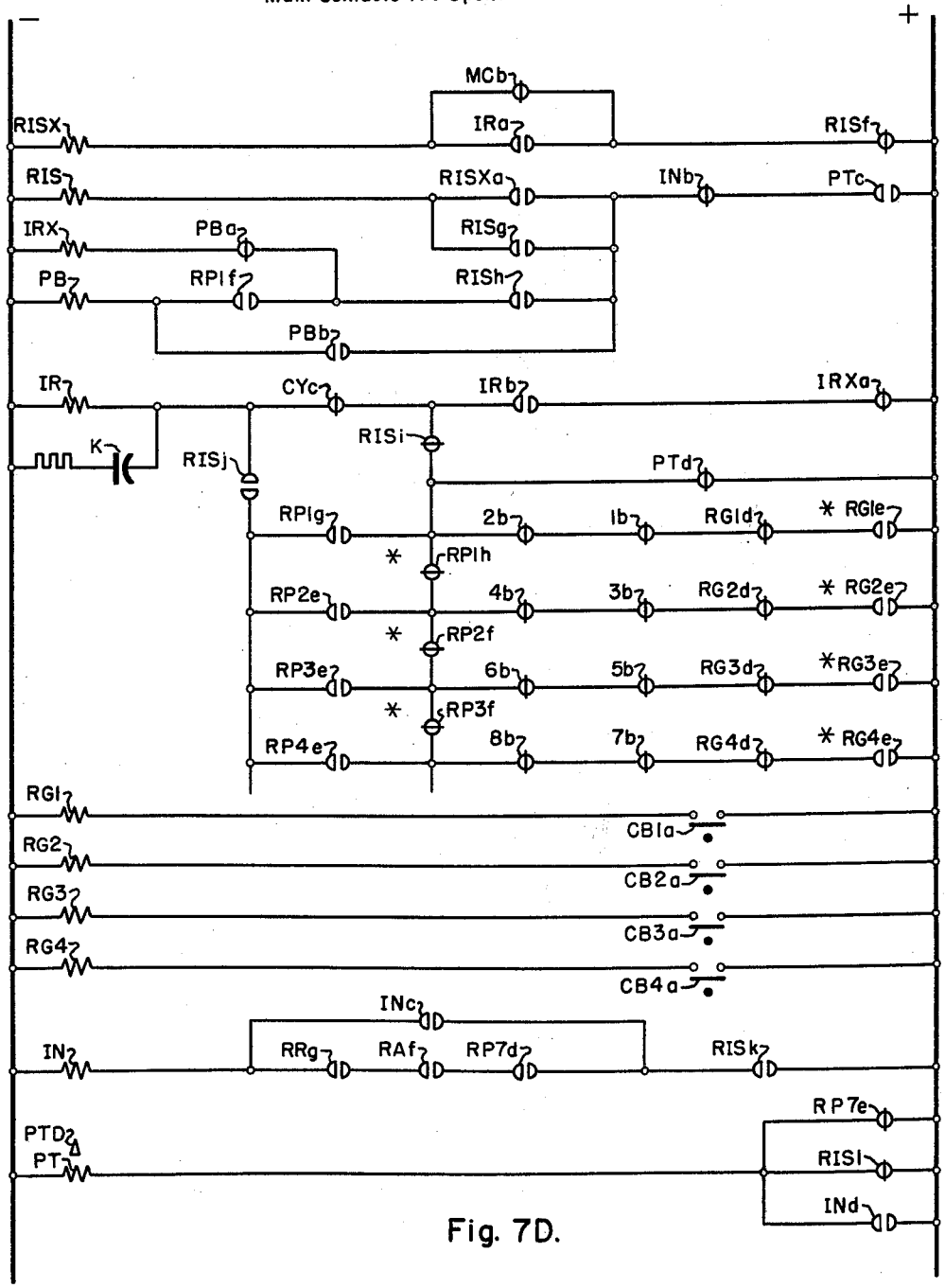
Figure 7E:
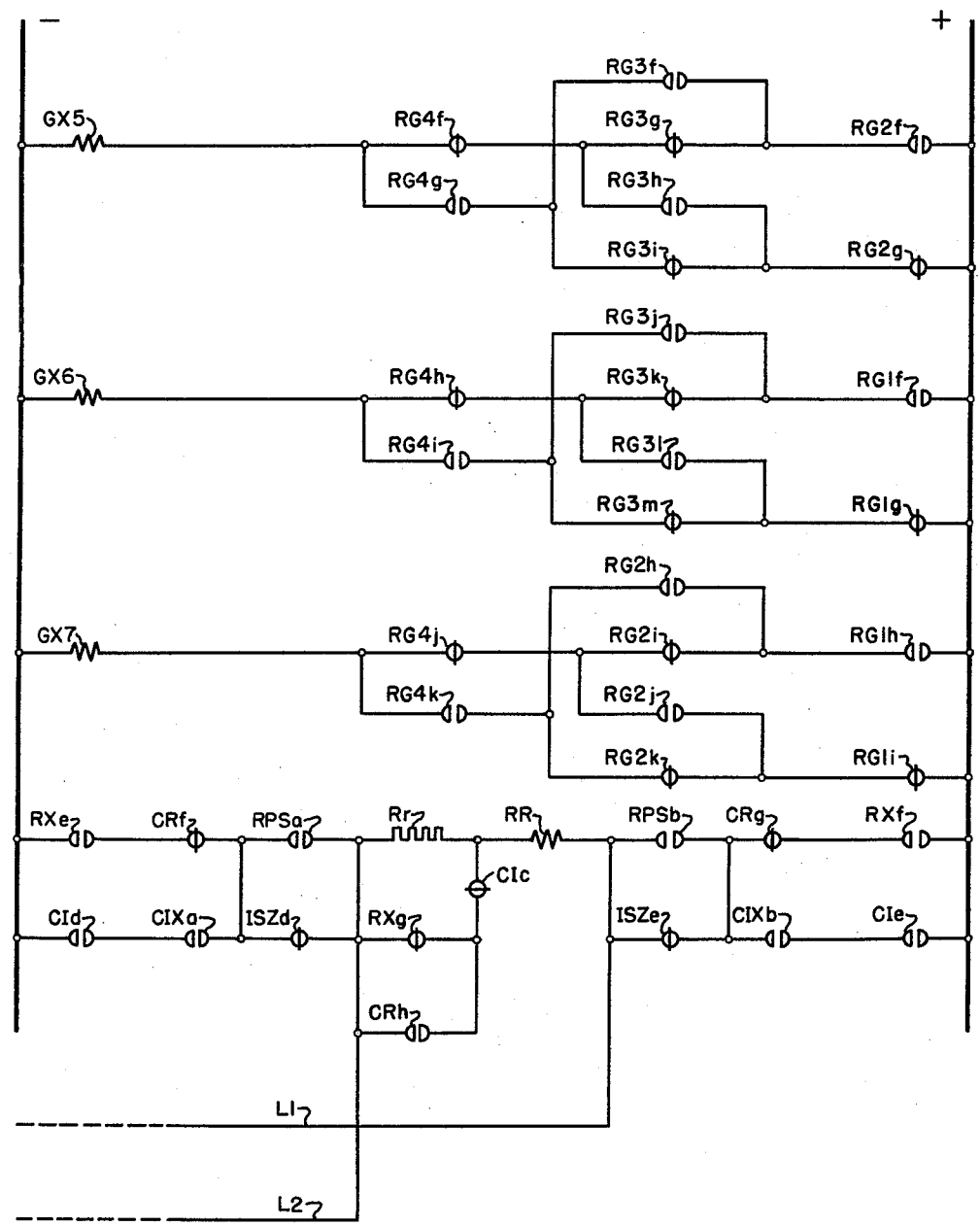
Figure 8A:
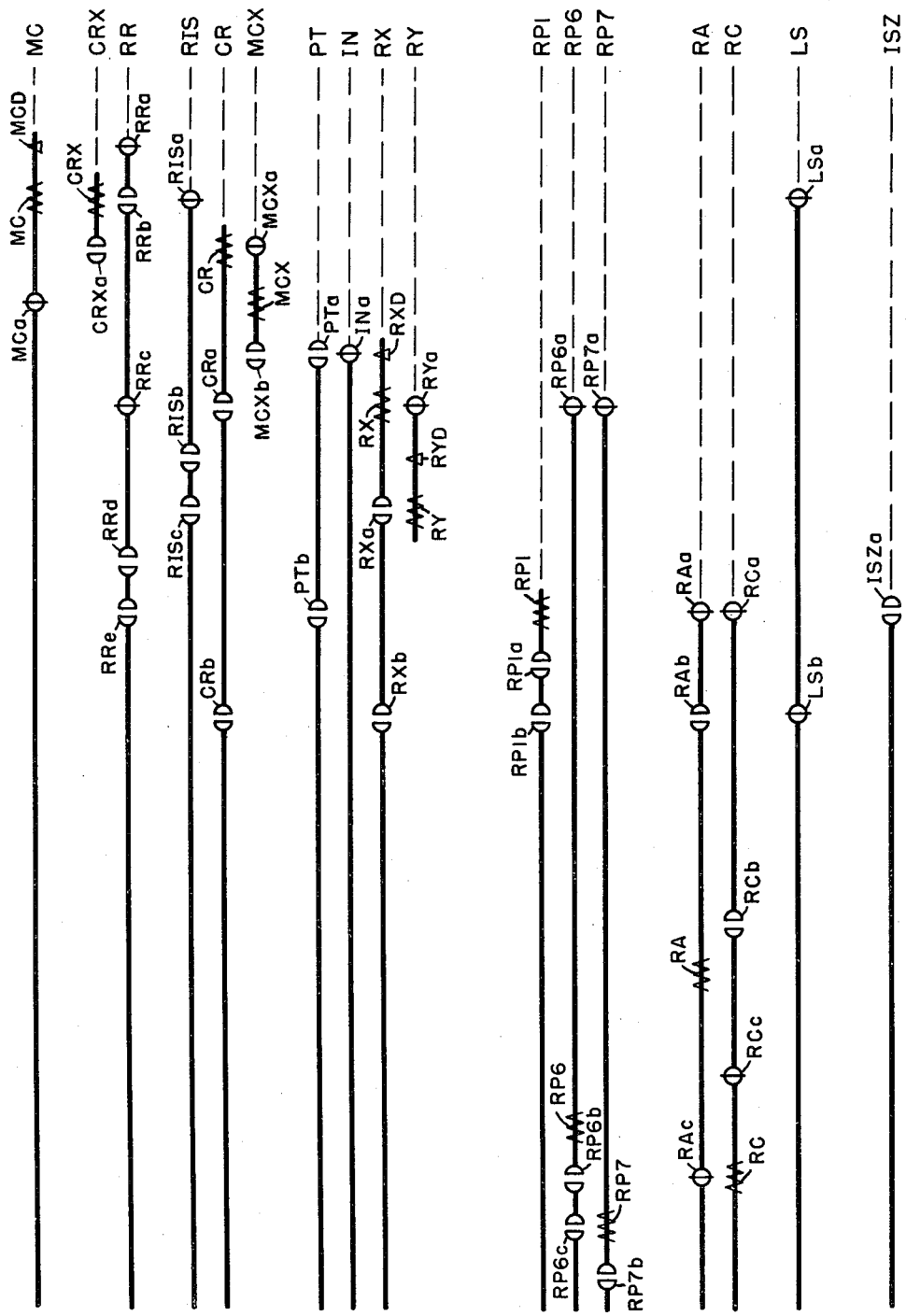
Figure 8B:
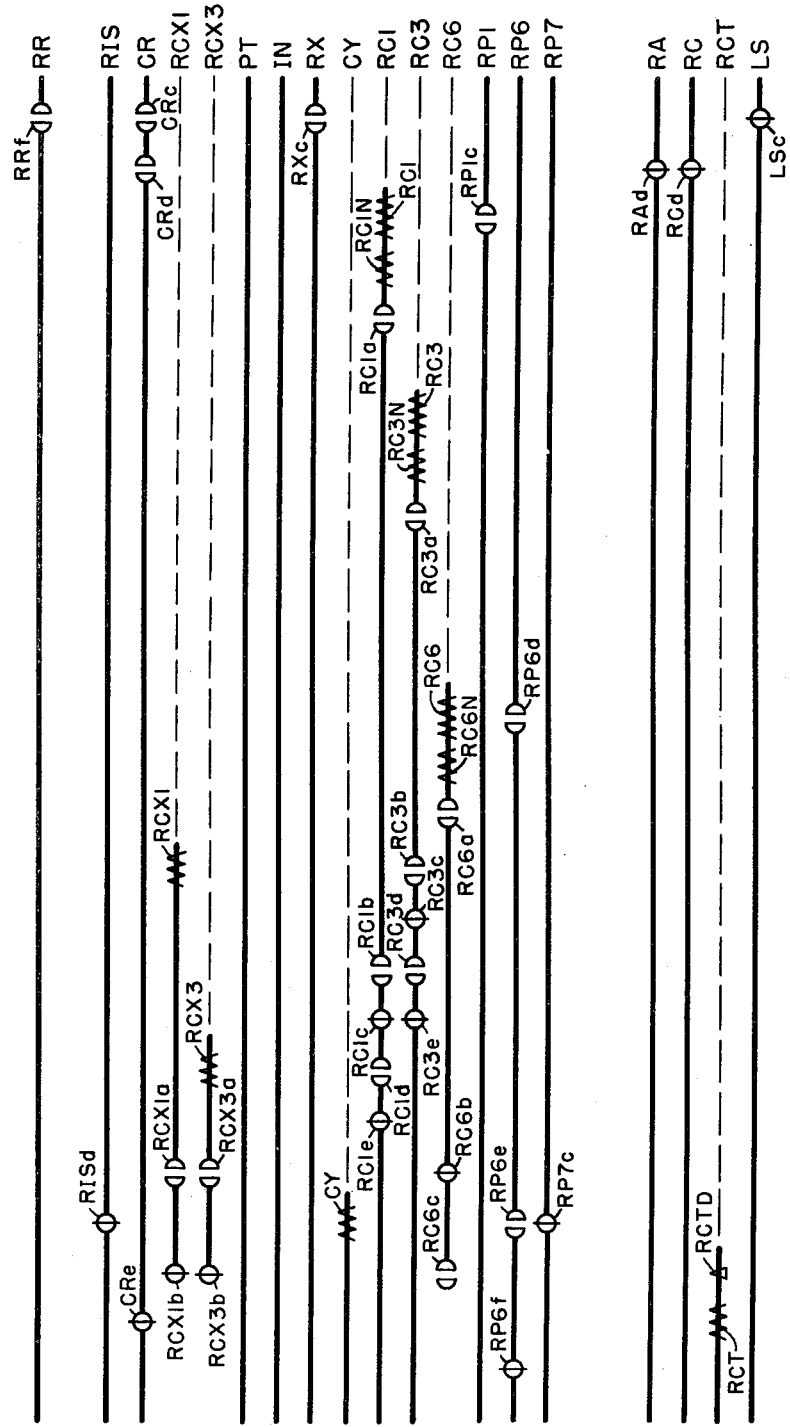
Figure 8C:
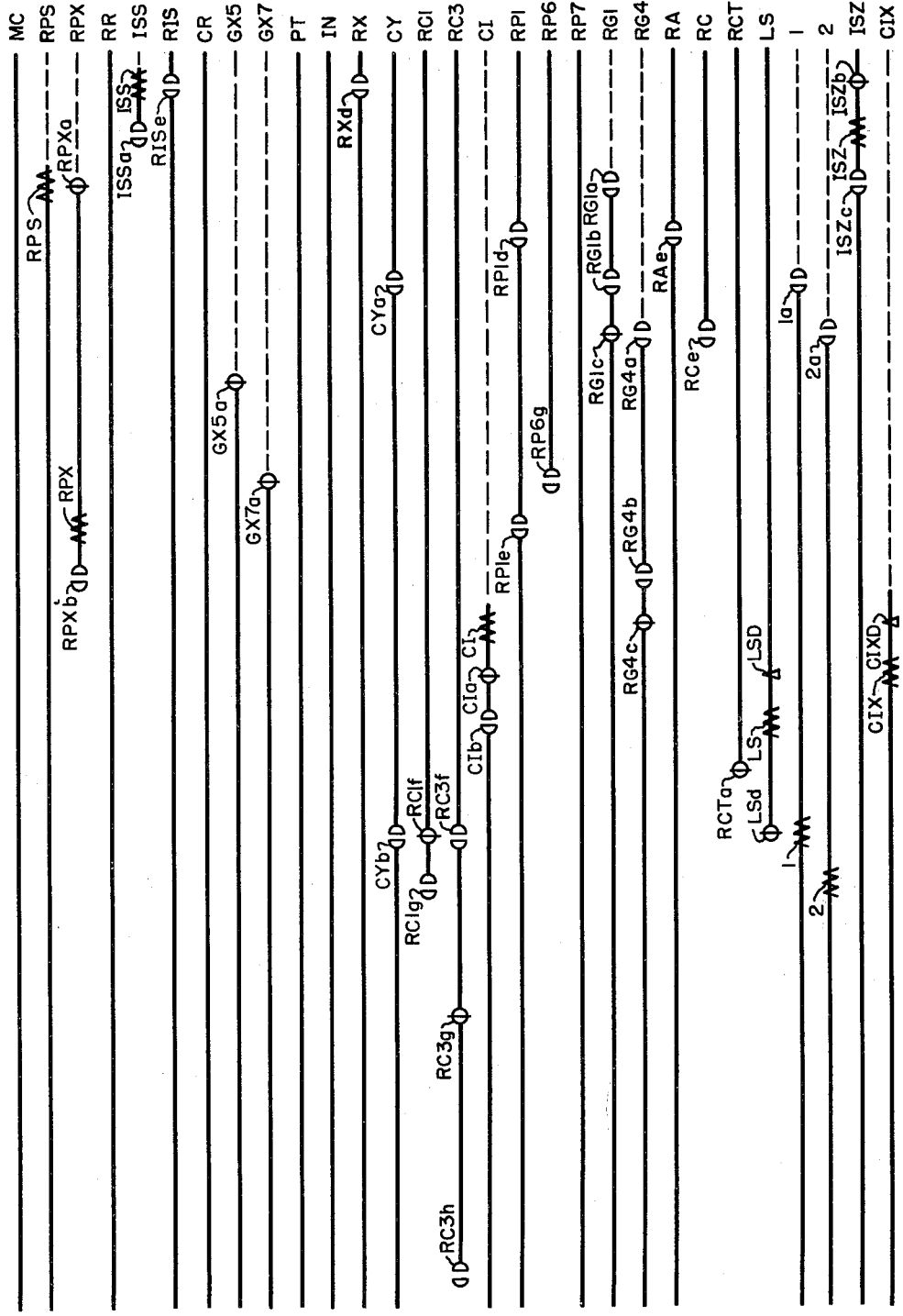
Figure 8D:
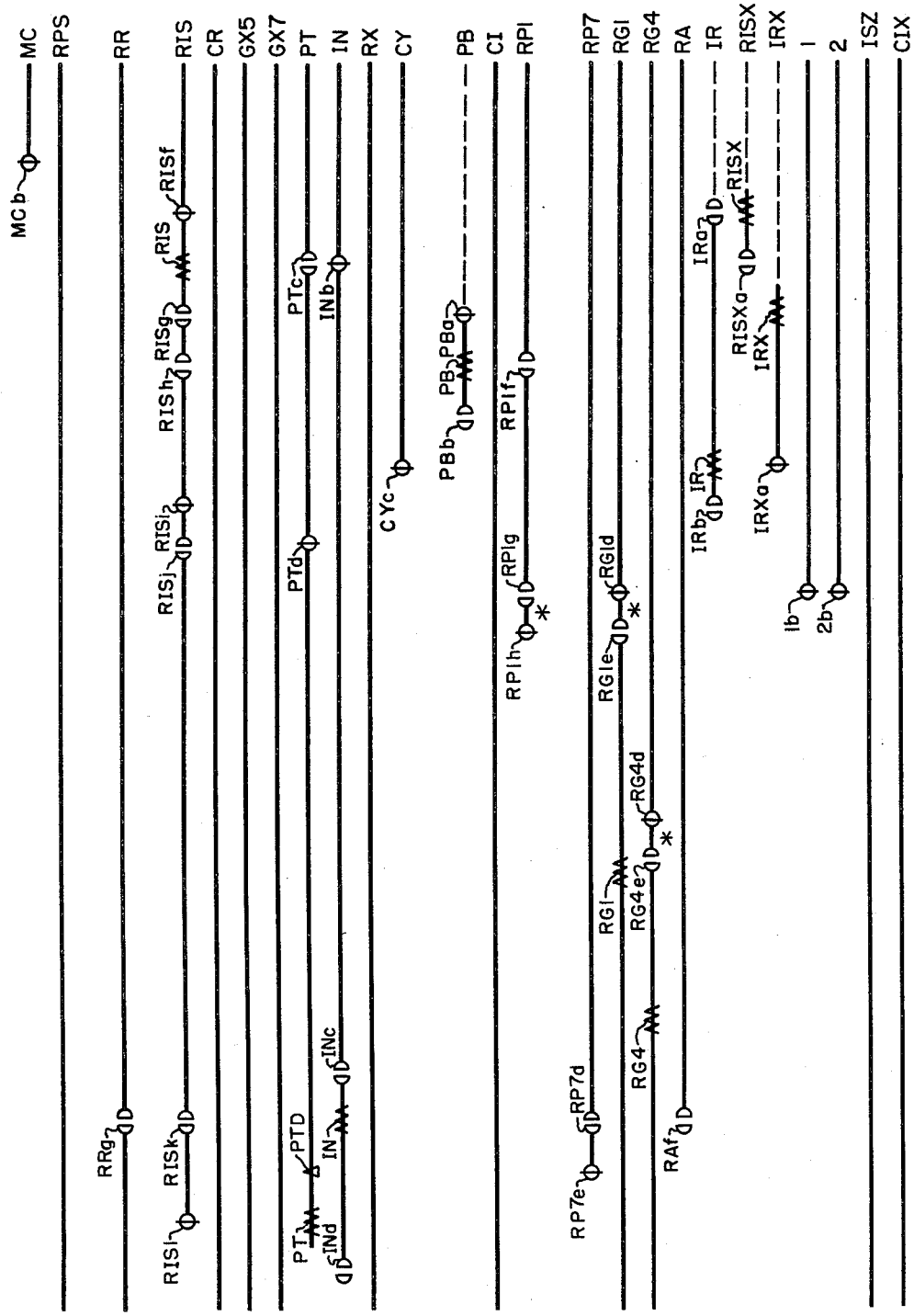
Figure 8E:
Figure 9:
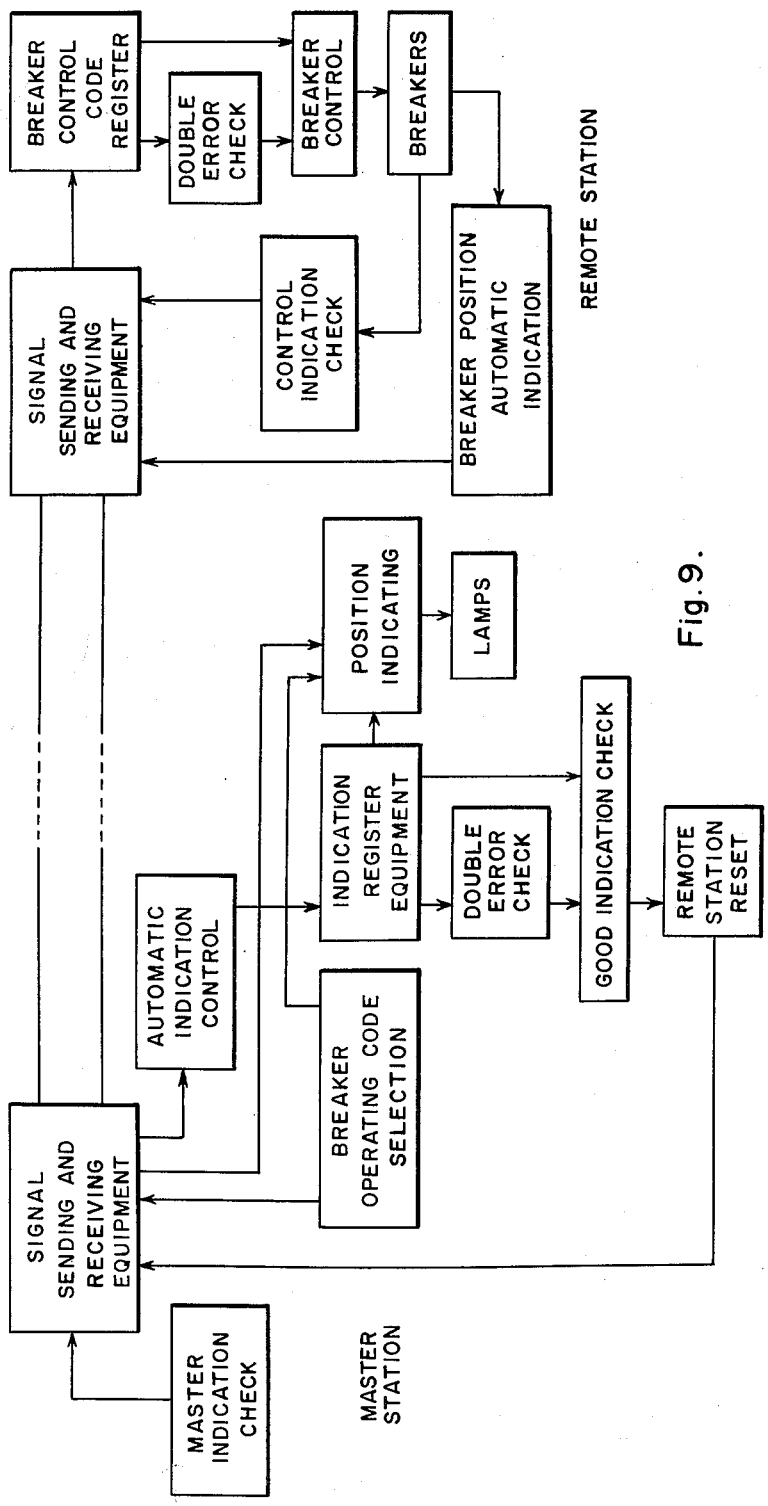

FIGS. 5A through 5E positioned one below the other in that order provide a schematic diagram of the dispatching office supervisory control equipment;

FIGS. 6A through 6E positioned one below the other are relay stem diagrams for typical ones of the relays of FIGS. 5A through 5E, respectively;

FIGS. 7A through 7E positioned one below the other in order provide a schematic diagram of the remote station supervisory control equipment;

FIGS. 8A through 8E positioned one below the other are stem diagrams of typical ones of the relays of FIGS. 7A through 7E, respectively; and FIG. 9 is a block diagram of the supervisory control system.

The supervisory control system shown schematically in FIGS. 5A through 5E and 7A through 7E is an improvement of the supervisory control system described in our copending application Serial No. 615,124, filed October 10, 1956, by William A. Derr and Sheldon D. Silliman, and assigned to the same assignee as this application, which has been forfeited and filed as a continuation on December 12, 1960, Serial No. 75,448, and is a self-checking system providing selective control and automatic indication of remotely located units such as circuit breakers by means of coded signals over a single transmission channel. The combined selection-control code uses a binary system, as does the indication scanning code, for determining the operating position of the remote units. Both the control and indication codes have a self-checking feature which can be used to detect both single and double errors during sending and receiving. The control codes, as shown in FIG. 3, each comprise a fixed total of six signal intervals, three for control and three for checking. The different number of possible codes for a given number of signal intervals follows the binary expression $X=2^n$ where X equals the number of code combinations and $n$ equals the number of enumeration signals. Check signals are added to the enumeration or control signals in a pattern that will permit each code to be checked for double errors.

In a binary signal system the total number of pulses or signals required to make a code double-error detecting is based on comparing each enumeration signal with two different check signals, and follows the binary expression $2^n-1$, where $n$ equals the number of check signals. The number of available enumeration signals on this basis is $2^n-(1+n)$, as shown in the table of FIG. 1.

A binary system is basically one which uses two signals of distinctive different characteristics, which may be designated as signal (1) and signal (2). These signals may, as described hereinafter, comprise the presence of a signal (1) and the absence of a signal (0), long and short pulses, signals of plus and minus polarity, signals of two different frequencies, such as F1 and F2, or even pulses of different amplitudes.

The pattern of check signals is partly a matter of the designer's choice with the enumeration and check signals occurring in different orders. The primary function in the present application being one of checking a presumably valid code, it is advantageous to transmit enumeration signals first, and have the basic circuitry set up before making the check, the most important consideration being that each enumeration signal be checked twice. This is accomplished by combining the enumeration signals in different groups with each of the check signals, so that each enumeration signal is compared with two of the check signals.

For the system hereinafter described, since only eight different codes are necessary to open and close four different circuit breakers, a fixed number of signals comprising three enumeration signals and three check signals, is used. Basically, two different types of signals are used, and each check signal is made either signal (1) or signal (2) so that the total of (1) or (2) for a particular check is either odd or even. For the coding arrangement having three enumeration and three check signals as in the control code, each check signal is selected so as to make the total of the (1) signals odd in each combination of enumeration and check signals. Likewise, for a code arrangement having four enumeration signals and three check signals as in the indication code, each check signal is selected to make the total number of (1) signals odd for each check. When a code having three check signals is received and one of the enumeration signals is in error, two of the check signals will detect this error. If two of the enumeration signals are in error, one of the check signals will detect the double error. This can be readily demonstrated by reversing any two signals, either enumeration or check, of a particular code, and applying the check signals thereto.

The indication check pattern is tabulated in FIG. 4 and the same basic checking principles are used. If the unit being supervised requires a red lamp indication, a (1) signal is used; if a green lamp indication is required, a (2) signal is used. As herein used, the (1) and (2) designation for signals represents the presence and absence of a signal respectively. It should be noted that (1) and (2) could indicate other binary signaling systems. For example, two transmission channels could be used, one for (1) signals and one for (2) signals. Yet another system would be to use a single pair of line wires and reverse the polarity of a D.-C. signal applied to the line wires to signify plus and minus pulses.

In a binary signal system, either of the two signals may be checked, and the check signal for each group of enumeration signals to be checked may be selected so as to make the total number of (1) or (2) in the group either odd or even. As shown in FIG. 2 for the control code, the check signal X1 is compared with the second and third enumeration signals and is made (1) or (2), so as to make the total number of signals (1) odd. Likwise, check signal X2 is compared with the first and third enumeration signals, and check signal X3 is compared with the first and second enumeration signals. In this manner, each enumeration signal is compared with two of the check signals to provide for double error detection. In control code No. 4 as shown in FIG. 3, enumeration signals are respectively (0), (0), (1). The first check signal X1 is therefore made (0), the second X2 is made (0) and the third X3 is made (1) in order to make the total number of signals (1) in each group odd.

The indication pattern of check signals is similarly ascertained. For example, as shown in FIG. 4, check signal X1 is compared with the second, third and fourth indication signals; X2 is compared with the first, third and fourth indication signals, and X3 is compared with the first, second and fourth indication signals. In each instance, the check signal is made (1) or (0) so as to make the total of signals (1) in each group odd. Each indication signal is thus checked with two check signals and double errors may thus be detected. The reason for making the check odd is that this eliminates the possibility of a code comprising all (0) signals, which would be the case in the event all circuit breakers were open.

Referring to FIGS. 5A through 5E, it will be seen that four selection switches SW1 through SW4 are provided for selecting and controlling their respective circuit breakers at the remote station. These switches in combination with associated operation buttons OP1 through OP4 provide control circuits for operating relays O1 through O8 to determine the operating position of control coding relays K1 through K6 which determine whether or not a pulse will be transmitted during a particular code interval. The pulses are produced by a signal pulse generator consisting of a signal relay X and a drive relay Y both of the delay type having short circuited turns designated by the suffix D which operate under the control of a start relay CS and a plurality of counting relays P1 through P8 which operate in conjunction with sequence relays A through C to determine the fixed number of signals produced. A starting pulse control relay PSZ operates in conjunction with an auxiliary starting pulse relay PSS to send a start pulse for starting the signal generator at the remote station. A transmission control relay PS is provided for controlling the connection of signal generator X to the signal channel conductors L1 and L2 to determine which of the pulses is to be transmitted. An auxiliary counting relay PX controlled by the counting relay P1 sets up a circuit for the transmitting control relay PS. A master check relay M is provided in conjunction with a master check pushbutton switch MCK and an auxiliary master check relay MX of the delay type having a short circuited delay winding MXD for sending a long pulse to obtain a check of the operation positions of the circuit breakers at the remote station. A setup relay MY sets up a circuit for a receiving relay R after the master check pulse is sent. A control timing relay CT is used to light a lamp L to indicate an abnormal control operation in the event that the control operation is not completed within a predetermined time. A normal operation is indicated by a control normal relay CN which operates in conjunction with an auxiliary delay relay CNX.

The remote station shown in FIGS. 7A through 7E may be operated from the dispatching office over any suitable channel, such as radio or carrier using suitable transmitting and receiving equipment, or as shown here for purpose of illustration, over wires L1 and L2. At the remote station, a receiving relay RR is provided which responds to transmitted signals. A long delay relay MC and an auxiliary check relay MCX are provided to detect the long master check pulse. Relay RR controls the operation of a receiving start relay CR which operates in conjunction with an auxiliary receiving start relay CRX to start the signal generator relay RX which is of the delay type in response to a start signal. A generator drive relay RY of the delay type operates in conjunction with the generator relay RX to provide a substantially free-running signal generator at the remote station which is stopped momentarily each time the receiving relay RR operates in response to a transmitted pulse.

A plurality of counting relays RP1 through RP7 which operate in conjunction with sequence relays RA through RC, operate selectively under the control of the receiving relay RR and the signal generator RX to count the number of signal intervals including the transmitted pulses and the absence of pulses. The signal generator RX and the receiving relay RR control the operation of a plurality of control code register and check relays RC1 through RC6 which have opposing main and neutralizing windings. The main windings contain more turns and operate the relay when energized in series with the opposing neutralizing winding designated by the suffix N; so that the relays are selectively energized or deenergized depending on whether the receiving relay RR operates. Control code check relays RCX1 through RCX3 are selectively operated to provide a check pattern for determining the operation of a valid code relay CY. A code timing relay RCT of the delay type having a delay winding RCTD times an interval to provide for resetting equipment in the event that an incomplete code is transmitted. A plurality of control relays 1 through 8 are provided for selectively setting up circuits to close or trip different ones of the four circuit breakers at the remote station in response to the positioning of the control code register relays RC1 through RC3. Relay CY stops an indication detection relay IR from operating. A control indication relay CI operates in conjunction with a delay relay CIX to send a single check pulse to indicate operation of the breaker. A delay reset relay LS is operated by relay CI to reset the equipment.

At the remote station, a plurality of alarm register relays RG1 through RG4 are controlled by auxiliary switches CB1a through CB4a of circuit breakers CB1 through CB4 to indicate the positions of the different circuit breakers. An indication start pulse relay ISS in conjunction with an auxiliary relay ISZ is controlled by an indication start relay RIS and an auxiliary start relay RISX to effect the operation of a signal transmission relay RPS to determine which of the pulses produced by the signal generator RX will be transmitted. The operation of the relay RPS is selectively determined by the positions of the relay RG1 through RG4 and indication check relays GX5 through GX7. An indication detection relay IR and an auxiliary relay IRX respond to a change of position of the position relays RG1 through RG4 to effect operation of the indication start relay RIS which starts the pulse generator RX. An indication stop relay IN stops the pulse generator by deenergizing the indication start relay ISS. An indication timing relay PT of the delay type provides for reinitiating operation of relay IR to repeat the scanning indication code in the event that a check signal is not received from the dispatching office within a predetermined time.

At the dispatching office, an indication start relay IS is provided which operates in conjunction with an auxiliary start relay ISX to prepare the counting relays and set up the circuits for the lamp relays C1 through C4 and the indication check relays C5 through C7. These relays have opposing main and neutralizing windings, the main windings having more turns so that when energized in series with the neutralizing windings designated by the suffix N, the relays operate. A valid code relay IG is controlled by the indication check relays C5 through C7 and the indication code relays CX1 through CX3 to indicate a valid code. This relay operates in conjunction with an auxiliary relay IGX having a delayed dropout to send a signal pulse to the remote station to indicate receipt of the code. A bad code check relay IX having a delayed dropout time greater than IGX, and a bad code reset relay IY are provided for deenergizing IS and resetting the equipment if the code is bad. The lamp relays C1 through C4 control the operation of red breaker-closed lamps R1 through R4 and green breaker-open lamps G1 through G4. Disagreement relays D1 through D4 are selectively controlled by the C1 through C4 relays in conjunction with the selection switches SW1 through SW4 to indicate agreement or disagreement of the breaker position with the switch position. A reset switch RS is provided for enabling the operator to reset the equipment. An alarm bell AB and lamp LL operate under the control of alarm relay DZ, and an alarm reset relay AR serves to reset them. Flashing lamp relays DX and DY flash the breaker lamps when there is disagreement between the control switches and breakers.

If the dispatcher desires to close the No. 2 circuit breaker, the control switch SW2 is moved from the green lamp or open position to the red lamp or closed position. Because the position of the switch SW2 does not now agree with the lamp indication, the green lamp G2 is flashed, the alarm lamp LL is lighted and the alarm bell AB is sounded. The operate push button OP2 is momentarily pushed, extinguishing the flashing green lamp and the alarm lamp, and silencing the alarm bell. The control code No. 3 (close for breaker CB2) is transmitted to the remote station following the transmission of a start pulse, whereupon the code is registered and checked. If the registered code is a valid code, control relay 3 is energized, and breaker CB2 closes, closing the auxiliary circuit breaker switch CB2. A single control check pulse is transmitted from the remote station to the dispatching office to verify the control operation of the breaker. The red lamp R2 is lighted.

To trip breaker CB2, the procedure is similar to that described above. The control switch SW2 is moved from the red to the green lamp position. The red lamp R2 flashes, the alarm lamp LL is lighted and the alarm bell AB is sounded. The operate push button OP2 is momentarily pushed, extinguishing the flashing red lamp and the alarm lamp, and silencing the alarm bell. Control code No. 4 is transmitted to the substation preceded by a start pulse. When breaker CB2 trips, auxiliary switch CB2a opens, and a control check pulse is transmitted to the dispatching office to indicate the completion of the function. This causes the green lamp G2 to be lighted.

For an automatic breaker operation, the remote station equipment sends a start pulse followed by a code consisting of four indication pulses (one for each breaker) and three check pulses. The lamps at the dispatching office are lighted in accordance with whether the four indication pulses are either (1) or (0), depending on the position of their respective breakers. Any lamps that do not agree with the position of the control switches are flashed and the alarm is sounded. The indication code is checked, and if correct, a single short pulse is sent to the remote station and the equipment returns to normal. The dispatcher can cause the flashing lamp or lamps to burn steady by moving the control switches to agree with the lamp indication. This will automatically cause the alarm lamp to be extinguished, and the alarm bell to be silenced. If the dispatcher desires to retain the flashing lamp or lamps, silence the bell and extinguish the alarm lamp, he operates the reset button RS. It should be noted that each time a remote alarm switch changes position all lamp indications are checked.

The master check operation in which all lamp indications are checked, is an adaptation of the normal indication operation described above. The master push button M at the dispatching office is momentarily pushed and an extra long pulse is sent to the remote station to cause the transmission of an indication code. The indication code transmission and check operation are the same as described above for automatic change and breaker position.

When the equipment is at rest, dispatching office relays CT, CNX, IX, IGX and MX are in the energized position. The C1 through C4 relays will be energized if the green lamps G1 through G4 are lighted. If the red lamps R1 through R4 are lighted, the relays C1 through C4 are deenergized. At the remote station, relays MC, PT, CIX and RCT are energized. Relays RG1 through RG4 will be energized if the circuit breakers are closed.

If the dispatcher desires to trip the No. 2 circuit breaker, the control switch SW2 is pushed to the trip position closing contacts SW2$b$, SW2$d$, SW2$f$. A circuit is provided for disagreement relay D2 through contacts SW2$f$ and C2$k$, causing the relay to operate and provide a circuit for the flashing lamp relay DX at contact D2$c$. This contact also provides an energizing circuit for the alarm relay DZ, which completes the circuit for the alarm lamp LL and the alarm bell AB through contact DZ$a$. Operation of relay DX sets up an energizing circuit for the drive relay DY, which interrupts the circuit of relay DX at contact DY$b$, thus causing flashing of the red lamp R2 which is connected to the bus through contact D2$b$ and contact DY$a$. As soon as the dispatcher pushes the operate key OP2, operating relay O4 is energized and contact O4$f$ opens to extinguish the flashing red lamp. At the same time, control relays K3 and K6 are energized through contacts O4$c$ and O4$d$, respectively. A circuit is also provided for the control start relay CS at contacts K3$a$ and K6$a$. Relays K3 and K6 being energized, the third and sixth signals will be signal (1) as circuits are provided for the pulse control relay PS through contacts K3$b$, P2$c$, B$d$ and K6$b$, P5$c$, B$d$. A break contact of the control start relay CS, CS1 interrupts the circuit to the alarm bell and the alarm lamp to deenergize the alarms. It will be noted that the determination of whether a pulse is to be sent or not is determined by circuits set up during the previous signal interval, so that the circuits for relay PS are in effect anticipatory. Relay PX determines with K1 the nature of the first enumeration pulse before P1, which operates to count the first pulse, even operates.

A make contact CS$d$ of the start relay prepares the pulse control circuit relays PSS, PSZ, PS and PX. A separate make contact CS$c$ completes the circuit to the pulse generator relays X and Y. Relay X operates and completes the circuit for relay Y, at contact X$b$, thus applying positive and negative voltage to the line wire conductors L1 and L2 through contacts X$g$, IS$k$, PSZ$e$ and X$e$, IS$j$, PSZ$d$. A break contact X$f$ of the pulse generator relay X opens to insert a resistance $r$ equal to the resistance of conductors L1 and L2, in circuit with the receiving relay R. Another make contact of relay X, X$c$ energizes the auxiliary start pulse relay PSS. As relay X releases, the pulse is removed from the line wire circuit, thus releasing the receiving relay R, and opening X$c$, so that the auxiliary start pulse relay PSZ is energized in series with relay PSS. A contact of relay PSZ, namely PSZ$c$, prepares the circuit for the transmitting control relay PS. With relay PX released and relay K1 operated, relay PS would be energized on the first enumeration pulse which occurs when X operates the second time and energizes P1 through PSZ$a$, X$a$, C$a$, B$a$ and A$a$. However, for control code No. 4, relay K1 is not operated, so relay PS remains deenergized. Accordingly, as relay X is energized the second time to produce the first binary code pulse, no pulse is applied to the line wire circuit because contacts PS$a$ and PS$b$ are open, and contacts PSZ$d$ and PSZ$e$ are open. Relay PS is thus energized when the binary pulse is signal (1) and deenergized when binary pulse is signal (0). Relays X and Y continue to function as a pulse generator. After the initial start pulse is sent, each time the relay X operates, relays P1 through P8 are energized in sequence, and the counting chain of relays P1 through P8 advances one count each time. When the third pulse is produced, relay PS is already set up through contacts K3$b$, P2$c$, B$d$ to provide for connecting the line wire conductors L1 and L2 to positive and negative through contacts X$g$, IS$k$, PS$b$, PS$a$, IS$j$, X$e$ to transmit a pulse. Likewise, when the sixth pulse is transmitted, relay PS is energized through the contacts K6$b$, P5$c$, B$d$, PSZ$c$, CS$d$ to connect the line conductors L1 and L2 to positive and negative. With the sending of the sixth pulse, the pulse generator is stopped by the opening of contact P6$c$. Thus pulses are transmitted in only the third and sixth intervals. A break contact P6$d$ interrupts the energizing circuit for the control timing relay CT, and a make contact P6$e$ sets up a circuit for the control normal relay CN.

At the remote station, the start pulse operates the receiving relay RR, and a make contact RR$b$ picks up relay CRX. A break contact RR$a$ interrupts the energizing circuit of relay MC which is a very slow release relay which will override three consecutive pulses. As relay RR is released at the end of the start pulse, contact RR$b$ opens and removes a shunt around the operating coil of relay CR so that it picks up in series with relay CRX. A make contact RR$d$ of the receiving relay energizes the drive relay RY, and with the release of relay RR and the energizing of relay CR, the circuit to the pulse generator relay RX is set up. When the relay RY is fully released, relay RX is energized through contacts RY$a$, CR$a$ and RR$c$, and the remote station pulse generator is started. A contact of relay CR, CR$b$ prepares the counting chain relays RP1 through RP7, so that either by relay RX or RR operating, the counting relays are energized in sequence with sequence relays RA through RC through either contact RR$e$ or contact RX$b$. The contacts of relays RA, RB, RC and RP1 to RP6 are arranged in the register circuit consisting of relays RC1 to RC6. When no pulse is received (signal 0), a contact of relay RX, contact RX$c$, provides an energizing circuit for the operating winding of the corresponding RC relay through contacts of the corresponding RP relay and its sequence relay. If a signal (1) is received, the receiving relay RR operates, and a contact RR$f$ closes and provides a shunt about the operating winding of the corresponding RC relay and energizes its neutralizing winding (designated by suffix N) causing it to release. For the control code No. 4, relays RC1, RC2, RC4 and RC5 are energized by contact RX$c$ and will be operated, and the operating windings of relays RC3 and RC6 are shunted by contact RR$f$ and are released.

When a signal (1) is being received, relay RR operates and a make contact RR$d$ energizes relay RY, while a break contact RY$a$ opens the circuit to relay RX. In effect, the pulse generator is stopped. With the release of relay RY, the pulse generator continues to function. For a signal (1), the pulse generator therefor does not operate, but for a signal (0), the pulse generator runs. This feature permits the received signals to self-synchronize the pulse generator.

The contacts of relays RC1 through RC3 are combined in an odd-even checking circuit of relays RCX1, RCX2 and RCX3. Thus relays RCX1 and RCX2 remain deenergized while relay RCX3 is energized through contacts RC2d and RC1d as both RC1 and RC2 are energized. The received check signals (4, 5 and 6) are compared with contacts of the check relays RC4, RC5 and RC6 in a circuit for the code checking relay CY. If the sixth pulse is registered and no seventh pulse is received and the check circuits are in agreement, relay CY operates to complete the circuit to control relay 4. The circuit in this instance may be traced through back contact RP7c, RC6b, RCX3a, RC5c, RCX2b, RC4c, RCX1b, RP6e and RISd. The circuit for relay 4 may be traced through contact RC3g, operating coil of relay 4, contact RC2i, contact RC1g, contact CYb and contact LSd. A break contact CYc blocks the alarm of register circuits of relay IR. A contact of relay 4 will trip breaker CB2 causing relay RG2 to open with the opening of auxiliary switch CB2a. A contact 4a in series with a break contact RG2c provides an operating circuit for the control operation indication relay CI. A break contact CIa deenergizes the auxiliary relay CIX which has delayed release, and a single check pulse is transmitted to the dispatching office through contacts CId, CIXa, ISZd, and contacts ISZe, CIXb, CIe. A make contact CIb energizes the reset relay LS which causes relays CRX and CR to be released by opening contact LSa. Contact CIc opens to insert resistor Rr in series with the receiving relay RR. A break contact LSc releases relays RC1 through RC6 resulting in the deenergization of relay CY and returns the equipment to normal.

As the sixth pulse is registered, relay RCT is deenergized by the opening of contact RP6f. Should the received code be incorrect or breaker CB2 not be tripped, relay CI would not operate. No pulse would be sent to the dispatching office, and as relay RCT is released at the end of its delay interval, relay LS would be operated by the closing of contact RCTa to return the remote station relays to normal.

At the dispatching office, the signal check pulse causes the receiving relay R to operate. A make contact Re causes the control normal relay CN to operate. Contacts CNc of relay CN complete the circuit to operate the relay C2 through the circuit including contacts CSj, CNc, and O4e. A break contact CNb releases relay CNX. When relay CNX is deenergized, contact CNXa opens deenergizing relays O4, K3, K6 and CS. Relay PSS is deenergized by the opening of contact CSd as are relays PSZ and PS. The opening of contact PSZa releases relay P6 and relay C. Contacts P6e open to deenergize relay CN. Contact C2k in circuit with contact SW2f are now open so that the disagreement relay D2 is released, and the green lamp G2 is energized through contact C2i, contacts O4f, O3g and D2a, as soon as relay O4 is released.

If no pulse is received from the remote station, relay CT is fully released to light the control abnormal lamp L through contact CTb. Operating the reset push button RS opens contact RSa and releases the relays O4, K3, K6, CS, PSS, PZ, P6, C and CN, and the control abnormal lamp L is extinguished by the opening of contacts CTb, since contact CSf closes and timing relay CT is thereupon re-energized. The equipment returns to normal, but the red lamp R2 will flash because the contacts C2k of relay C2 are in disagreement with the position of the control switch SW2 just as when the switch SW2 was first moved to the trip position. Another trip operation may be attempted by again pushing the operating push button.

If the circuit breaker CB2 is automatically tripped with the other breakers remaining closed and relays RG1, RG3 and RG4 energized, relay RG2 will be released by the opening of the circuit breaker auxiliary switch CB2a. A circuit is momentarily completed for the indication relay IR through contact CYc, RISi, RP1h, 4b, 3b and make-before-break contacts RG2d and RG2e. Capacitor K is charged to insure positive operation of the indication detection relay IR which seals in through contact IRb. A contact IRa operates relay RISX, and a contact RISXa energizes the indication start relay RIS which seals in through contact RISg. The pulse generator is started by contact RISb which provides a circuit for the generator relay RX. Contact IRSa opens to block relays CR and CRX, while contact RISd opens to block relay CY. Another contact RISe prepares the circuits to relays ISS, ISZ, RPS and RPX. As the relay RX operates, a signal is applied to the line wire conductors L1 and L2 through contacts RXe, CRf, ISZd, ISZe, CRg, RXf to transmit the start pulse. A contact RXd energizes relay ISS, and as relay RX is released by the operation of relay RY, contacts RXd open and relay ISZ is energized in series with relay ISS. Contacts ISZc prepare the circuits to relays RPS and RPX, while contacts ISZa prepare the circuits for the counting relays RP1 to RP7. With relay RG1 operated, the relay RPS is energized through contacts RG1a, RPXa so that when the first indication code pulse is produced, a pulse is applied to the line wire circuit through contacts RXe, CRf, RPSa and RPSb, CRg, RXf. As relay RX operates for the first indication pulse, relay RP1 is energized through contact RXb to advance the counting chain one count. The pulsing continues for seven pulses with the counting relays RP2 through RP7 being operated in sequence. The second indication pulse is a (0) signal since breaker CB2 is open and RG2a is open, so that relay RPS is not energized on the second pulse. Accordingly, the pulse generator relay RX is not connected to the line wire conductors on the second pulse. The third and fourth pulses occur with relay RPS being energized since the breakers CB3 and CB4 remain closed as did breaker CB1. Accordingly, the pulse generator is connected to the line wire conductors on the third and fourth line indication pulses. The last three pulses of the seven are check pulses which are determined by the position of the contacts of relays RG1 to RG4 in the circuits of the check relays GX5 through GX7. Relay GX6 is energized through contacts RG1f, RG3j and RG4i while relays GX5 and GX7 are deenergized. Thus relay RPS is energized through GX5a and GX7a to send pulses in the fifth and seventh intervals.

As the seventh pulse is transmitted, a break contact of counting relay RP7, namely RP7e, releases the slow-to-release timing relay PT. If no indication check pulse is received from the dispatching office, relay PT is fully released to open contact PTc and release relay RIS and the counting chain relay, so as to reinitiate operation of the indication relay IR through contact PTd, to repeat the indication scanning code. If a check pulse is received from the dispatching office, relay IN is energized through contacts RRg, RAf, RP7 and RISk, and releases relay RIS by opening contact INb to return the equipment to normal.

It should be noted that after relay RIS is energized, relay IRX is energized through contact RISh and the indication detection relay IR is released by the opening of contact IRXa. When the counting relay RP1 operates, relay PB is energized through contact RP1f to release relay IRX by opening contact PBa, and thus set up relay IR for any other change in the RG relay contacts. In other words, the circuits just described insure that a change of position of any RG relay will be recorded. The path of the IR relay to the make-before-break RG relay contacts is through a make contact RISj of relay RIS and through a make contact of relay RP1, RP2, RP3, etc. As the remote station sends pulses, a change of an RG relay already indicated thus operates the relay IR. A change of an RG relay, which has not yet been indicated, does not operate the relay IR. When the IR relay is operated during the transmission of the indication code, the equipment will repeat the indication code operation after either the check pulse from the dispatching office is received or relay PT times out.

At the dispatching office, the initial start pulse operates the receiving relay R and energizes auxiliary indication start relay ISX through contact Rf. As the receiving relay R releases after the start pulse contact R*f* opens and relay IS is energized in series with relay ISX, a contact IS*b* of relay IS prepares the counting relays, while another contact IS*h* sets up the C1 to C7 indicating and check relays, and contacts IS*c* and IS*d* start the pulse generator relays X and Y. As either relay X or relay RR operates, the counting chain of relays P1 through P7 operate in sequence with relays A, B and C to advance one count through each operation of contact R*a* or X*a*. If the transmitted code pulse is signal (1), relay R is operated and the corresponding C relay is deenergized, since the operating winding is shunted by contact R*g*. If the transmitted code pulse is signal (0), the receiving relay R does not operate, the generator relay X does operate, and the corresponding C relay is energized through contact X*d*. Whenever the relay R operates, contact R*b* opens to stop the relay X. For the case assumed, the breaker CB2 being open and breakers CB1, CB3 and CB4 being closed, pulses are transmitted on signals 1, 3 and 4 while signal 2 comprises no pulse. Accordingly, relays C1, C3 and C4 would be released and only relay C2 would be energized. As the C relays change positions, contacts in the disagreement relay D circuit are changed, and in the case assumed, the contacts of relay C2 will be in disagreement with the operating position of the switch SW2, and an energizing circuit is provided for relay D2 through contacts C2*j* and SW2*e*. A circuit is, therefore, provided for the flashing bus relays DX and DY through contact D2*c* and the alarm relay DZ so that the green lamp G2 is flashed. By positioning the switch SW2 in the green lamp or open position, contact SW2*e* is opened and relay D2 will be deenergized, relays DX, DY and DZ are deenergized, and the flashing lamp G2 will burn steady and the alarm lamp LL and the alarm bell AB will be cleared.

After all the indication and indication check pulses are registered on relays C1 to C7, the combination of contacts of relays C1 to C4 operate relays CX1 to CX3 in accordance with the indication check system. With the indication code of 1011 transmitted for breaker 2 open, X1 will be (1), X2 will be (0) and X3 (1) as per the table of FIG. 4. Accordingly relay C5 will be down, relay C6 up, and C7 down. Contacts of relays C5 to C7 and CX1 to CX3 are compared, and if the code is correct, the valid code relay IG is operated through a circuit extending through contacts P8*b*, C7*b*, CX3*a*, C6*c*, CX2*b*, C5*b*, CX1*a* and P7*f*. Contacts IG*b* deenergize slow-to-release relay IGX, and contacts IG*c* and IG*d* in conjunction with contacts IGX*b* and IGX*c* connect the line wire conductors L1 and L2 to positive and negative to transmit a single check pulse to the remote station. Contact IG*e* connects register *r* in series with relay R, and contact IG*a* opens to deenergize IS and ISX and reset the equipment. If the received indication code is in error, no check pulse is transmitted, and when IX times out IY is energized through contacts IX*a* and IGX*a*. Contact IY*b* deenergizes IS and ISX to reset the equipment.

Upon receiving the indication check pulse at the remote station, the receiving relay RR is operated and the indication normal relay IN is energized through contact RR*g*, and the indication timing relay PT which was first released as the indication code was transmitted is energized through contacts IN*d*. A break contact IN*b* releases the indication start relay RIS to return the equipment to normal. If no pulse is received, the operation is as described previously in conjunction with the relay PT.

A master check operation in which all lamp indications are sequentially checked from the dispatching office is generally similar to the normal indication operation. The dispatcher operates the master check push button MCK energizing the master check relay M which provides a holding circuit for itself through contact M*b*. A break contact M*c* releases relay MX. Contacts MX*c*, M*g*, IS*j*, PSZ*d*, and PSZ*e*, IS*k*, MX*b*, M*h* apply an extra long pulse (longer than three pulses) to the line wire circuit. At the remote station, relay RR is operated and interrupts the energizing circuit for the delay relay MC at contact RR*a*. Relay MC eventually releases, closing contact MC*a*, to energize relay MCX which seals in through contact MCX*b*. A contact of relay MC, MC*b* closes in the circuit of the auxiliary start relay RISX which operates and closes contact RIS*g* to operate relay IS to initiate a normal indication scanning code. The remainder of the indication cycle of operations is the same as that described hereinbefore following the automatic operation.

From the above description and the accompanying drawings, it will be apparent that we have provided a self-synchronous binary coding supervisory control system which is self-checking and extremely reliable. Since the binary signals comprise pulses and absence of pulses, the system we have described may be made much faster in operation than the system which uses long and short pulses since a long pulse must be approximately three times longer than a short pulse to insure positive discrimination for a reliable coding operation. By utilizing separate pulse generators at the transmitting and receiving ends of the system, and utilizing transmitted pulses to tie the operations of the two generators together, reliable operation is assured. A minimum of signals is required to be transmitted by using local pulse generators, thus minimizing the possibilities of errors in losses of pulses.

Since certain changes may be made in the above-described construction and different embodiments of the invention may be made without departing from the spirit and scope thereof, it is intended that all the matter contained in the above description and shown in the accompanying drawings shall be considered as illustrative and not in a limiting sense. While the invention has been described as operating to close or trip circuit breakers, it will be realized that it may also be used to start or stop motors, to open or close valves or to perform other similar functions.

We claim as our invention:

1. In a binary signaling system, a free-running pulse generator, receiving means, means operable in response to a start signal to start the pulse generator, counting means operated by the receiving means and the pulse generator to stop the pulse generator after a predetermined number of pulse intervals, and means operated by the receiving means to stop the pulse generator momentarily in any pulse interval when the receiving means operates.

2. In a supervisory control system, a receiving relay, a free-running signal generator, means controlled by the receiving relay to start the signal generator, said receiving relay being operable to stop the signal generator during a signal interval each time the receiving means operates, counting means controlled selectively by the receiving means and the signal generator to stop the signal generator after a predetermined number of signal intervals, and means controlled by the receiving means operable to prevent the receiving means from operating the counting means on the initial pulse.

3. In a binary signaling system, a free-running pulse generator, a receiving relay, means operable to start the pulse generator after receipt of an initial pulse by the receiving relay, means operable to stop the pulse generator only while the receiving relay is operated, and counting means operated by the receiving relay and the pulse generator after receipt of the initial pulse operable to render the pulse generator inoperative after a predetermined number of operations of the counting means.

4. In a supervisory control system for controlling apparatus at a remote station from a dispatching office connected thereto by a signal channel, a signal generator at the dispatching office, a free-running signal generator at the remote station, start means at the dispatching office operable to start the signal generator at the dispatching office, receiving means at the remote station responsive to signals from the dispatching office, means responsive to initial operation of the receiving means to start the signal generator at the remote station, counting means at the dispatching office operated by the signal generator at the dispatch office, after the initial signal to stop the signal generator at the dispatching office after a predetermined number of operations, means connecting the signal generator at the dispatching office to the signal channel during selectively predetermined ones of said predetermined number of operations to provide different predetermined codes, counting means at the remote station operated jointly by the receiving means and the remote station signal generator to stop the signal generator at the remote station after said predetermined number of operations of the signal generator at the dispatching office, means responsive to operation of the receiving means to stop the signal generator at the remote station only while the receiving means is operating, relay means selectively responsive to the operations of the receiving means and the remote station signal generator, and means selectively responsive to the positions of said relay means to provide an operating circuit for a particular piece of said apparatus in accordance with the code transmitted.

5. In a supervisory control system for controlling apparatus at a remote station from a dispatching office connected thereto by a signal channel, a signal generator at the dispatching office, a free-running signal generator at the remote station, start means operable to start the generator at the dispatching office, means including receiving means at the remote station responsive to a signal from the dispatching office signal generator to start the generator at the remote station, counting means operated by the dispatching office signal generator to stop said generator after a predetermined number of signals, means including an operation switch individual to each piece of apparatus operable to connect the dispatching office signal generator to the channel to transmit only predetermined ones of said signals, means at the remote station stopping the signal generator thereat each time the receiving means operates in response to a transmitted signal, and relay means selectively responsive to operations of the receiving means and the remote station signal generator to effect operation of a particular piece of said apparatus depending on the sequence of operations of the receiving means and the remote station signal generator.

6. Supervisory control apparatus comprising, free-running signal generator at each of a dispatching office and a remote station having a signal channel extending therebetween, means at the dispatching office for starting the dispatching office signal generator to apply a start signal to the channel, counting means at the dispatching office responsive to other than the start signal to stop the dispatching office generator after a predetermined number of signals, means at the dispatching office connecting the signal generator to the signal channel for only predetermined ones of said signals, receiving means at the remote station connected to the signal channel to respond to signals therefrom, means responsive to operation of the receiving means to start the remote station signal generator, circuit means including contacts of the receiving means stopping the remote station signal generator each time the receiving means operates, and counting means operated by the receiving means and the remote station signal generator to stop the signal generator after a predetermined number of operations.

7. In a supervisory control system, a first pulse generator at a dispatching office which is connected to a remote station by a signal channel, means to start the pulse generator to apply pulses to the channel, receiving means connected to the signal channel at the remote station to respond to pulses applied to the channel, means at the dispatching office including a control device for each of a plurality of pieces of apparatus to be controlled at the remote station for selectively disconnecting the generator from the channel on predetermined ones of said pulses to provide a predetermined code of pulses and no pulses, a second pulse generator at the remote station, means for starting the second pulse generator at the remote station in response to the first of said pulses, means controlled by the receiving means to stop the second pulse generator at the remote station when a pulse is received, and means including a relay of the delayed dropout type operable to maintain a setup circuit for the remote station pulse generator starting means during the intervals between received pulses to enable the second pulse generator to be free-running during the no-pulse portion of each code.

8. In a supervisory control system, a free-running pulse generator producing only one type of pulse at each of a sending and a receiving station, means at the sending station controlling the sending station pulse generator to transmit only predetermined ones of the pulses produced thereby to produce different signal codes comprised of pulses and no pulses, means at the receiving station operable to start the receiving station pulse generator, and means at the receiving station operated by said pulses from the sending station to monitor operation of the receiving station pulse generator to correct variations in pulsing therebetween.

References Cited in the file of this patent

UNITED STATES PATENTS

| 1,709,031 | McCoy | Apr. 6, 1929 |
| 2,518,405 | Van Duuren | Aug. 8, 1950 |
| 2,612,562 | Baker | Sept. 30, 1952 |
| 2,623,939 | Derr | Dec. 30, 1952 |
| 2,626,382 | Coley | Jan. 20, 1953 |
| 2,640,872 | Hartley et al. | June 2, 1953 |
| 2,725,417 | Connell | Nov. 29, 1955 |

FOREIGN PATENTS

| 632,774 | Great Britain | Dec. 5, 1949 |